United States Patent
Nakai et al.

(10) Patent No.: US 8,204,660 B2
(45) Date of Patent: Jun. 19, 2012

(54) APPARATUS FOR CONTROLLING AUTOMATIC TRAVEL OF VEHICLE

(75) Inventors: Yasuhiro Nakai, Kariya (JP); Masayoshi Takeda, Kariya (JP); Kazunori Kadowaki, Nagoya (JP)

(73) Assignees: DENSO CORPORATION, Kariya (JP); Advics Co., Ltd., Aichi-pref. (JP)

( * ) Notice: Subject to any disclaimer, the term of this patent is extended or adjusted under 35 U.S.C. 154(b) by 879 days.

(21) Appl. No.: 12/199,271

(22) Filed: Aug. 27, 2008

(65) Prior Publication Data
US 2009/0062068 A1 Mar. 5, 2009

(30) Foreign Application Priority Data

Aug. 28, 2007 (JP) .................................. 2007-221144

(51) Int. Cl.
*G06F 7/00* (2006.01)
(52) U.S. Cl. .......................................................... 701/65
(58) Field of Classification Search .................... 701/51, 701/58, 65; 477/97, 107, 110, 115, 120, 477/194, 195, 203, 900, 901, 904
See application file for complete search history.

(56) References Cited

U.S. PATENT DOCUMENTS

| | | | |
|---|---|---|---|
| 4,618,040 A | 10/1986 | Homma et al. | |
| 5,455,767 A * | 10/1995 | Staerker | 701/55 |
| 5,819,897 A | 10/1998 | Murata | |
| 7,512,474 B2 * | 3/2009 | Tabata et al. | 701/91 |
| 7,996,139 B2 | 8/2011 | Okuda et al. | |

FOREIGN PATENT DOCUMENTS

| | | |
|---|---|---|
| DE | 102 006 000 422 | 3/2007 |
| JP | A-S60-012360 | 1/1985 |
| JP | A-04-345541 | 12/1992 |
| JP | A-09-202159 | 8/1997 |
| JP | A-2001-047988 | 2/2001 |
| JP | A-2005-051886 | 2/2005 |
| JP | A-2005-282453 | 10/2005 |
| JP | A-2007-009894 | 1/2007 |
| JP | A-S63-043854 | 2/2008 |

OTHER PUBLICATIONS

Office Action mailed Feb. 28, 2012 in corresponding JP Application No. 2007-221144 (and English translation).

* cited by examiner

*Primary Examiner* — Paul N Dickson
*Assistant Examiner* — Robert A Coker
(74) *Attorney, Agent, or Firm* — Posz Law Group, PLC

(57) ABSTRACT

An apparatus controls automatic travel of a vehicle equipped with a motive power generator. In the apparatus, information indicating a road surface on which a vehicle is present currently is acquired. It is determined whether or not a command for shifting the vehicle from its stopped state to its traveling state is issued. When the command is issued, automatic shift of the vehicle is made from its stopped state to its traveling state by controlling drive of the motive power generator based on the acquired information. It is further determined whether or not, of a component of gravity applied to the vehicle, there is a force component applied in a direction opposite to a travel direction of the vehicle. When there is the force component, the operation applied to the motive power generator is continued even if the brake pedal is pressed by the driver.

15 Claims, 16 Drawing Sheets

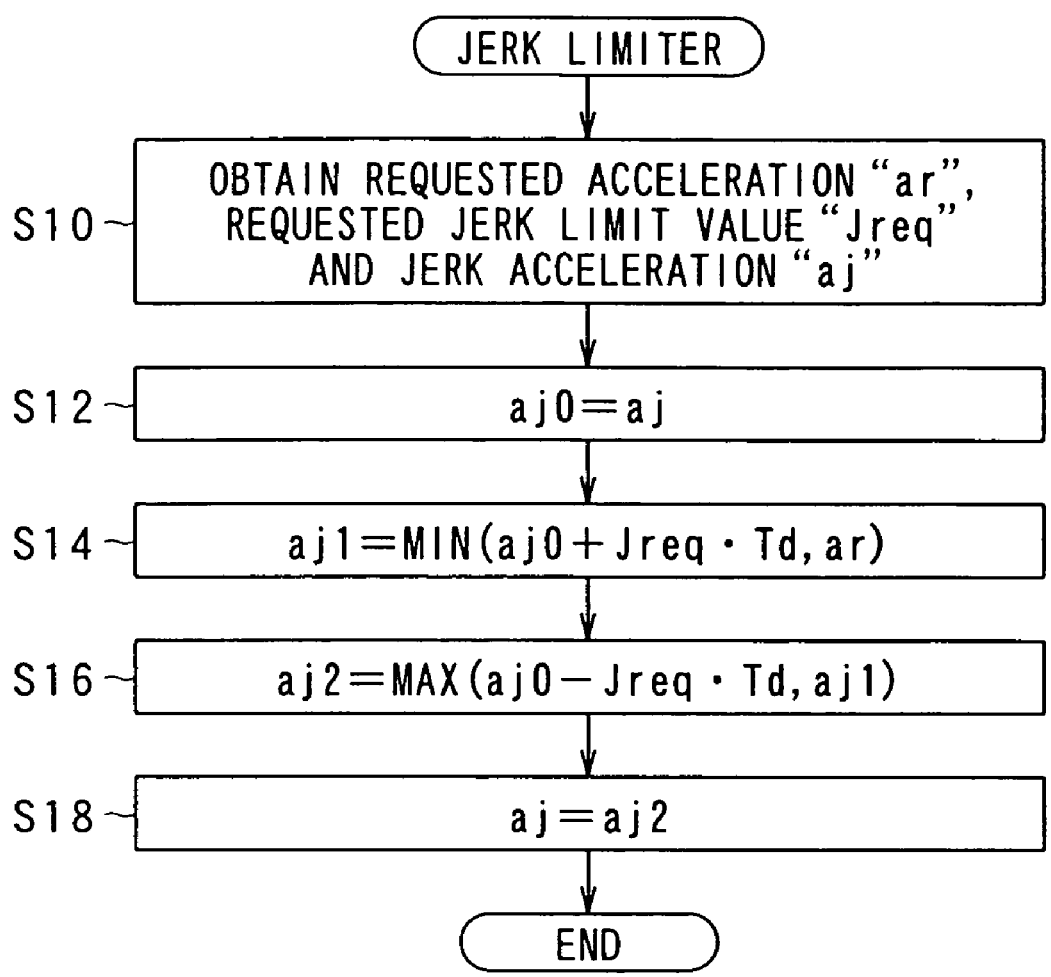

RESPONSE CHARACTERISTICS OF ACTUAL VEHICLE

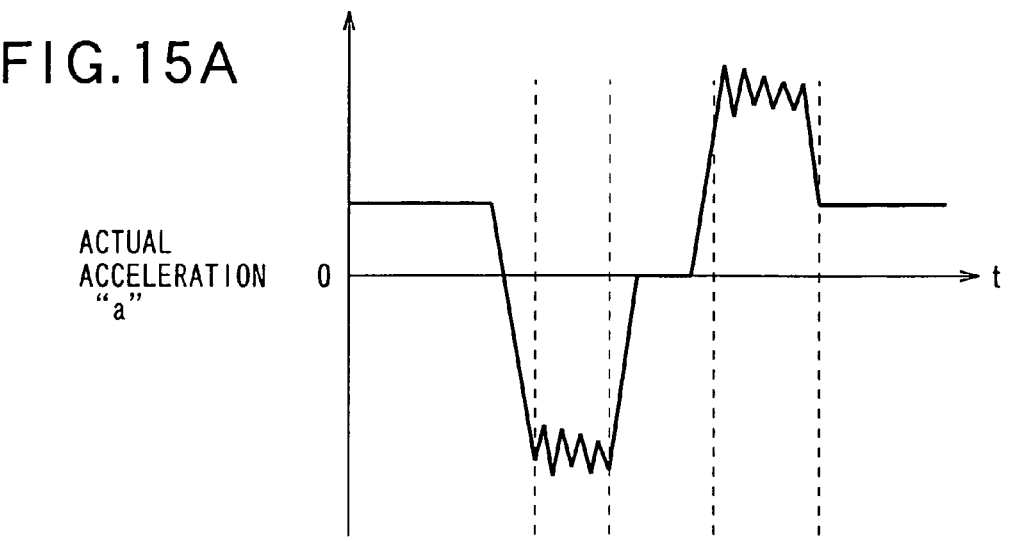
FIG.15A ACTUAL ACCELERATION "a"
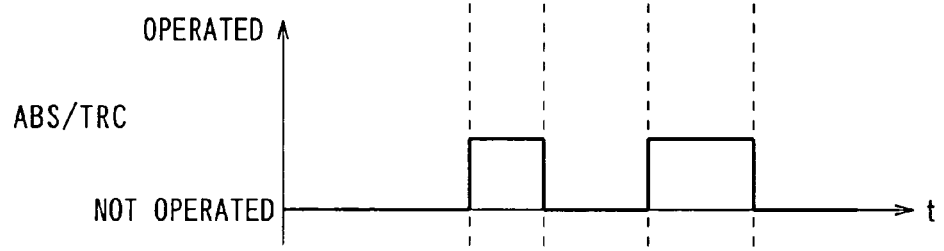
FIG.15B ABS/TRC
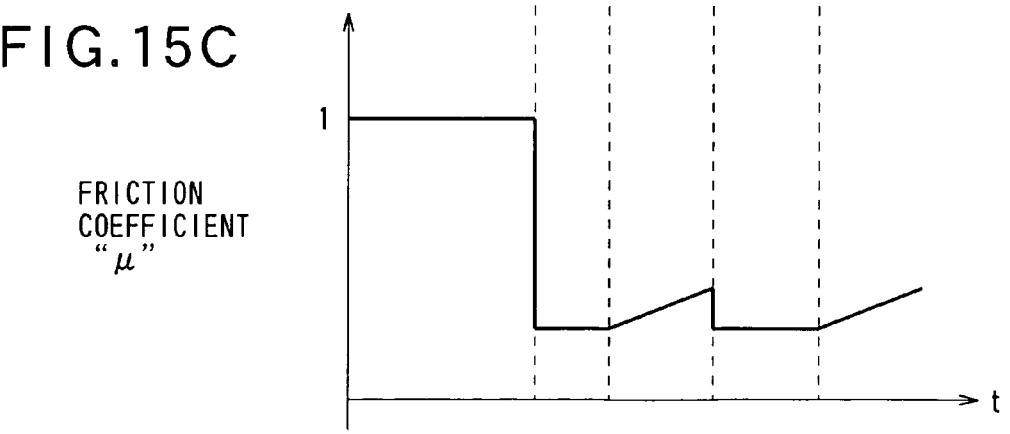
FIG.15C FRICTION COEFFICIENT "μ"

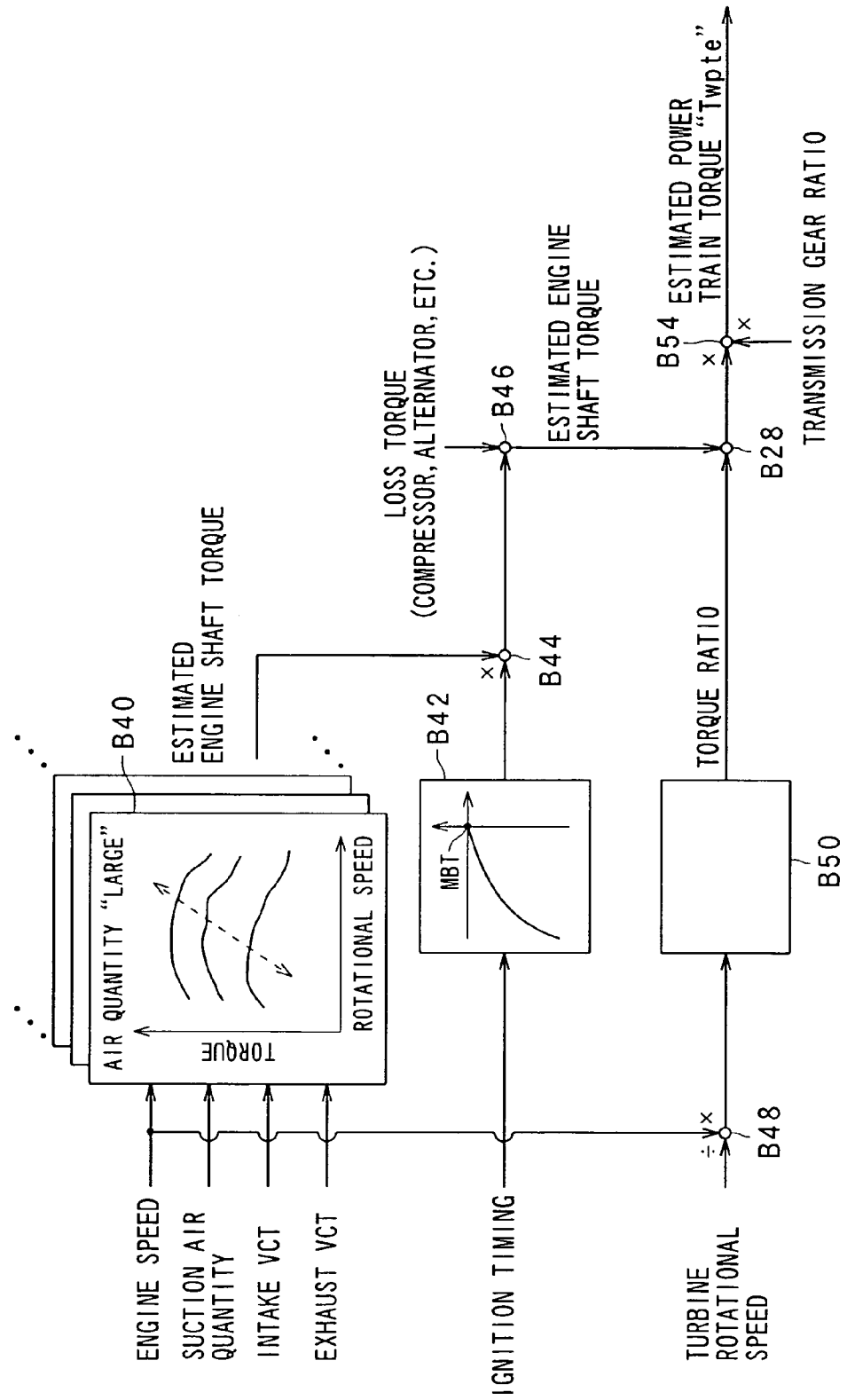

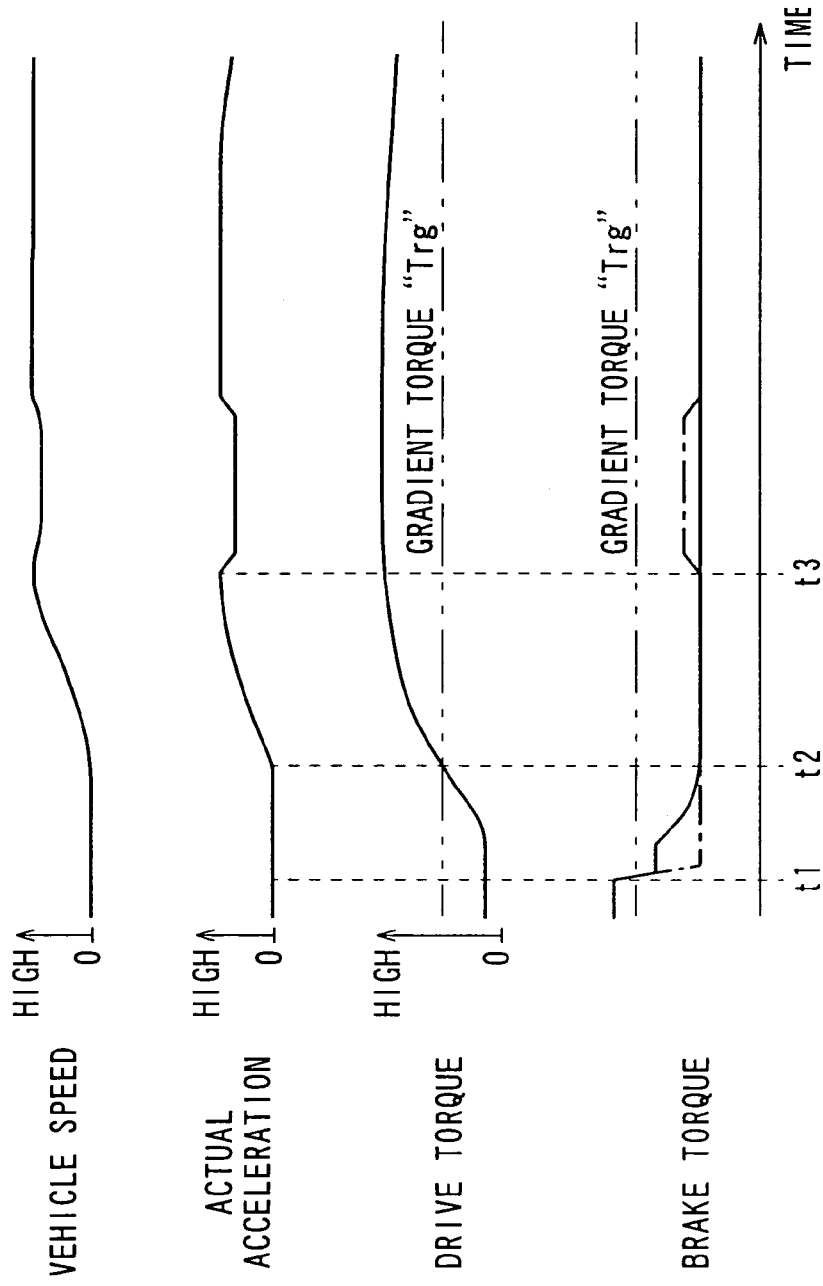

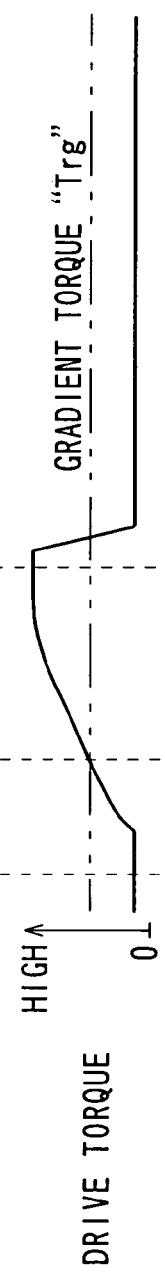
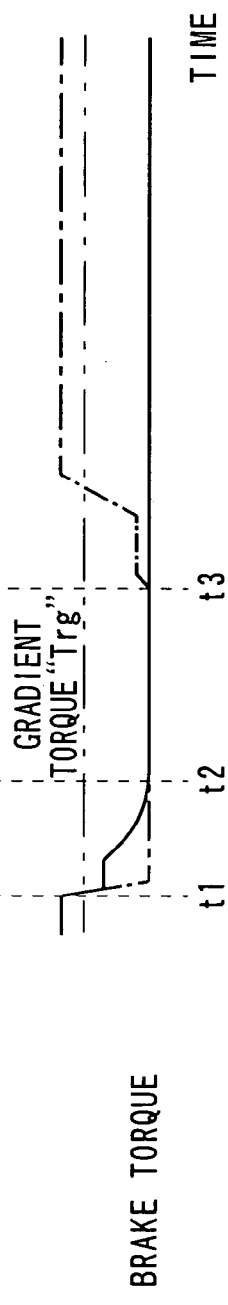
FIG. 19A PRIOR ART — VEHICLE SPEED
FIG. 19B PRIOR ART — ACTUAL ACCELERATION
FIG. 19C PRIOR ART — DRIVE TORQUE
FIG. 19D PRIOR ART — BRAKE TORQUE

APPARATUS FOR CONTROLLING AUTOMATIC TRAVEL OF VEHICLE

CROSS-REFERENCE TO RELATED APPLICATION

This application is based on and claims the benefit of priority from earlier Japanese Patent Application No. 2007-221144 filed Aug. 28, 2007, the description of which is incorporated herein by reference.

BACKGROUND OF THE INVENTION

1. Technical Field of the Invention

The present invention relates to an apparatus for controlling automatic travel of a vehicle, and in particular, to the apparatus having a function of automatically shifting a stopped state of the vehicle to a traveling state thereof.

2. Related Art

In recent years, there is known an apparatus having a function of automatically controlling the torque generated by an on-vehicle motive power generator, in the case where a vehicle is in the process of transition from a stopped state to a traveling state.

This type of control apparatus is suggested, for example, in Japanese Patent Laid-Open Publication No. 2005-051886. In the apparatus suggested in this literature, the torque to be imparted to the drive wheels by the motor is determined in starting the vehicle. Specifically, the torque is determined either based on the value obtained by multiplying a torque that is the balance of the gravity acting in the backward-movement direction of the vehicle when the vehicle is started, with the distribution rate of the torque, or based on the value of the requested torque corresponding to the user's manipulation of the accelerator, whichever is larger. The distribution rate is set so as to become larger as the inverse rotational speed of the on-vehicle motor becomes higher. Thus, the apparatus suggested in this literature is so configured that the torque generated by the motor is increased in the case where the vehicle moves backward when the brakes are released by the user on an ascending slope. Owing to this configuration, the vehicle can be prevented from moving backward by a large extent even on an ascending slope.

In the control apparatus mentioned above, however, the torque imparted to the drive wheels immediately after release of the brakes will be insufficient to overcome gravity causing backward movement of the vehicle, and thus the vehicle resultantly moves backward. When the user manipulates the accelerator for this backward movement, the torque corresponding to the user's manipulation of the acceleration will be imparted to the drive wheels. However, if this torque is excessively large, the drive wheels will lock or skid on the road surface. During the locking or skidding, the vehicle may be brought into the traveling state as the vehicle starts displacing in the travel direction. However, no braking force that would balance the gravity applied in the backward-movement direction of the vehicle will be obtained, if the user again steps on the brakes in an attempt to control the vehicle speed. Thus, the vehicle may again move backward.

As explained above, it may sometimes be difficult to adequately bring a vehicle from a stopped state into a traveling state, depending on the user's operation of the vehicle.

SUMMARY OF THE INVENTION

The present invention has been made in order to resolve the problem mentioned above, and has as its object to provide a vehicle control apparatus which is able to adequately bring a vehicle from a stopped state into a traveling state, irrespective of the conditions of the road surface, and also to provide a control system equipped with the vehicle control apparatus.

To achieve the object, as one aspect, the present invention provides an apparatus for controlling automatic travel of a vehicle equipped with a motive power generator that generates torque to propel the vehicle and a brake to be pressed by a vehicle driver to stop the vehicle, comprising: acquisition means for acquiring information indicative of a road surface on which a vehicle is present currently; first determining means for determining whether or not a command for shifting the vehicle from a stopped state of the vehicle to a traveling state of thereof is issued; automatic shift control means for automatically shifting the vehicle from the stopped state of the vehicle to the traveling state of the vehicle by controlling drive of the motive power generator based on the acquired information, when it is determined that the command is issued; second determining means for determining whether or not, of a component of gravity applied to the vehicle, there is a force component applied in a direction opposite to a travel direction of the vehicle; and operation continuing means for continuing the operation applied to the motive power generator even if the brake is pressed by the driver, when it is determined by the second determining means that there is the force component.

In the above configuration, use of the information concerning the road surface near the vehicle may enable adequate grasp of the torque of the on-vehicle motive power generator, which torque is required for shifting the vehicle from the stopped state into the traveling state. Then, the motive power generator can be operated based on the torque grasped in this way, so that the vehicle can be automatically transited into the traveling state, without displacing the vehicle in the direction opposite to the travel direction. In particular, the automatic transition into the traveling state may enable minute adjustment of the torque of the motive power generator, which minute adjustment may otherwise be difficult depending on the user's manipulation of the accelerator pedal. Thus, the vehicle can be adequately transited into the traveling state.

However, the gravity exerted on the vehicle may contain components directed to the direction opposite to the travel direction. During the control associated with the automatic transition mentioned above under such conditions, the torque imparted to the drive wheels may be drastically reduced in the case where the control associated with the automatic transition is stopped according to the braking instructions issued by the user. In this case, the vehicle speed is drastically reduced, and with the braking instructions issued by the user, the vehicle may be stopped again. Under such conditions, the operation of the motive power generator is required to be continued for the control associated with the automatic transition, irrespective of the user's brake pedal manipulation. In this regard, the above configuration can prevent drastic decrease of the torque imparted to the drive wheels by the motive power generator. In this way, the problems mentioned above may be appropriately prevented.

The term "travel direction" refers to the direction to which the vehicle is requested to be directed when there is a request for shifting the vehicle into the traveling state. In other words, the term "travel direction" refers to the direction to which the vehicle should be displaced by the user's request.

It is preferred that the apparatus comprises speed detecting means for detecting a travel speed of the vehicle; speed determining means for determining whether or not the travel speed of the vehicle becomes higher than a predetermined speed and then becomes zero; and control ending means for causing the automatic control means to end the control thereof, when the speed determining means determines that the travel speed of the vehicle becomes higher than the predetermined speed and then becomes zero.

In the case where the travel speed of the vehicle once becomes equal to or higher than a predetermined speed by automatically shifting the vehicle from the stopped state to the traveling state, the speed change can be regarded as having been achieved by the control associated with the automatic transition. When the travel speed is zeroed afterward, the zeroing for stopping the vehicle can be regarded as having been performed by the user's brake pedal manipulation. In other words, it can be determined that the temporal zeroing of the travel speed has been performed not in the process of the control associated with the automatic transition. In light of this point, the above configuration sets the ending requirement of the control associated with the automatic transition, to be the fact that the travel speed of the vehicle has once become equal to or higher than a predetermined speed and then has been zeroed. Thus, before ending the control associated with the automatic transition, the state of the vehicle can be adequately grasped as to whether or not the control is requested to be ended.

It is also preferred that the apparatus comprises torque determining means for determining whether or not the torque which is set by the automatic control means is smaller than the torque requested from the driver by pressing the brake, and further control ending means for causing the automatic control means to end the control thereof, when the set torque becomes larger than the requested torque.

According to this configuration, the control associated with the automatic transition can be ended in the case where the user's requesting torque exceeds the torque requested by the automatic shift control means. Thus, the hindrance of the user's request can be adequately avoided, which hindrance would have been caused by the control associated with the automatic transition.

It is still preferred that the information includes information indicative of a slope of the road surface on which the vehicle is present currently, and the automatic shift control means is adapted to control the drive of the motive power generator so that the motive power generator generates the torque to overcome the force component applied in the direction opposite to the travel direction of the vehicle.

In the this configuration, when it is determined that the gravity is exerted in the direction opposite to the travel direction, the automatic shift control means permits the motive power generator to generate torque for overcoming the force component in the direction opposite to the direction in which the gravity is exerted. Thus, the torque generated by the motive power generator may be drastically decreased if the control associated with the automatic transition is stopped by the user's brake pedal manipulation. Therefore, the advantages of the preceding configurations can be particularly exerted in a preferable manner by the above configuration.

It is preferred that the apparatus comprises acceleration setting means for setting a target acceleration based on the travel speed of the vehicle; and feedforward control means for feedforward-controlling an actual acceleration of the vehicle to the target acceleration by operating the derive of the motive power generator based on the slope of the road surface.

In this configuration, when the gravity is determined to be exerted in the direction opposite to the travel direction, the automatic shift control means can permit the motive power generator to generate torque for overcoming the components opposite to the direction in which the gravity is exerted, in order to effect feedforward control based on the components opposite to the direction in which the gravity is exerted.

It is preferred that the apparatus comprises limiting means for limiting the torque generated by the motive power generator based on the information acquired by the acquisition means so as not to cause lock or skid at wheels of the vehicle.

In respect of the torque generated by the motive power generator, the range where no locking or skidding is caused to the wheels of the vehicle relies on the road surface conditions near the vehicle. The above configuration focuses on this point, and uses the information related to the road surface conditions near the vehicle. This may enable operation of the motive power generator while the torque is limited so as to fall within the range of causing no locking or skidding to the wheels. Thus, in shifting the vehicle into the traveling state, the inconveniences caused by the locking or skidding of the wheels can be avoided.

It is preferred that the first determining means is adapted to determine the command based on information showing a driver's release action of the brake.

When the user desires the vehicle be shifted from the stopped state into the traveling state, the brakes are tended to be released. Thus, in this configuration, the user's desire can be appropriately determined.

BRIEF DESCRIPTION OF THE DRAWINGS

In the accompanying drawings:

FIG. 4 is a flow diagram illustrating a procedure performed by a jerk limiting reference model setter of the vehicle longitudinal distance controller;

FIGS. 15A to 15C illustrate a scheme for estimating a friction coefficient between a road surface and wheels, according to the present embodiment;

FIG. 17 is a block diagram illustrating a procedure for calculating an estimated power train torque, according to the embodiment;

FIGS. 18A to 18D are time diagrams illustrating a mode of hill start, according to the embodiment; and FIGS. 19A to 19D are time diagrams illustrating a mode of hill start, according to the conventional technique.

DETAILED DESCRIPTION OF THE PREFERRED EMBODIMENTS

With reference to the accompanying drawings, hereinafter will be described an embodiment of a vehicle control apparatus according to the present invention.

Figure 1:
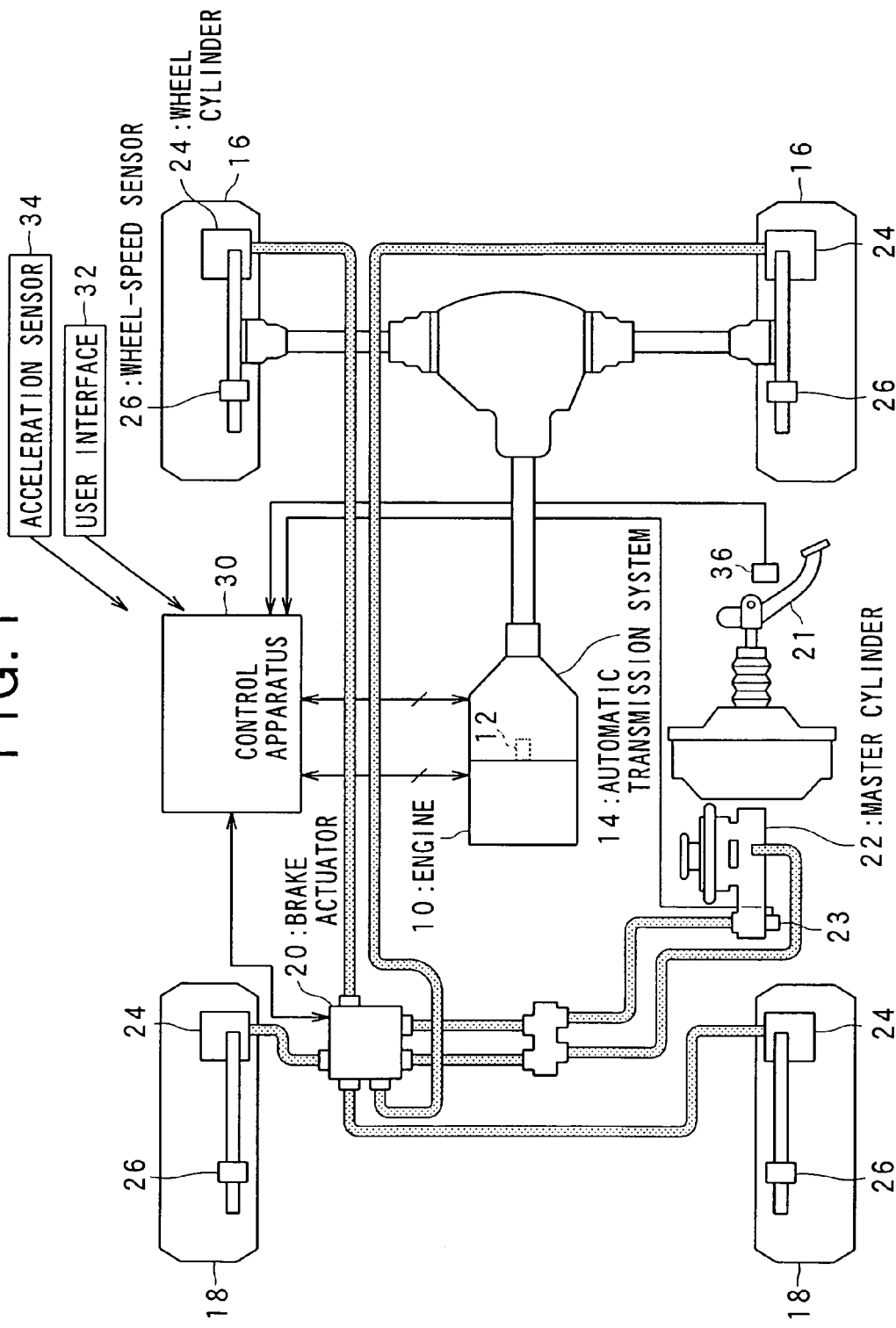
FIG. 1 illustrates a general configuration of a vehicle control system, according to an embodiment of the present invention.

FIG. 1 illustrates a general configuration of a vehicle control system, according to the embodiment of the present invention.

An engine 10, a gasoline powered internal combustion engine, includes a crank shaft 12 to which an automatic transmission system 14 is connected. The torque of the crank shaft 12 of the engine 10 is changed by the automatic transmission system 14 and then transmitted to drive wheels 16.

Drive wheels 16 and idler wheels 18 can be imparted with braking force by a hydraulic brake actuator 20. The brake actuator 20 is configured to adjust the pressure of hydraulic oil supplied to a wheel cylinder 24, for each of the wheels (the drive wheels 16 and the idler wheels 18), to adjust braking force. The brake actuator 20 also has a function of adjusting the braking force to be produced by the wheel cylinder 24 in each of the wheels, according to the pressure in a master cylinder 22 whose hydraulic-oil pressure is adjusted by the manipulation of a brake pedal 21. Specifically, in the present embodiment, the hydraulic-oil pressure in each wheel cylinder 24 is electronically controllable by the brake actuator 20, while the hydraulic-oil pressure in each wheel cylinder 24 is mechanically controlled by the manipulation of the brake pedal 21. It should be appreciated that a hydraulic sensor 23 is provided in the master cylinder 24 to detect the interior pressure.

Each of the drive wheels 16 and the idler wheels 18 is provided with a wheel-speed sensor 26 for detecting the rotational speed of the wheel.

A control apparatus 30 is configured to control the vehicle, by manipulating the engine 10 and the automatic transmission system 14, as well as the brake actuator 20, and the like. Specifically, the control apparatus 30 retrieves detection values of various sensors for detecting the operating conditions of the engine 10 and the automatic transmission system 14, as well as the output signals of the hydraulic sensor 23, the wheel-speed sensors 26, a user interface 32, an acceleration sensor 34 and a brake sensor 36 to control traveling of the vehicle based on these values and signals. The user interface 32 includes an automatic travel switch through which the user can request automatic travel of the vehicle, an accelerator operating member through which the user can request torque increase to the engine 10, and a travel directing member (e.g. a shift lever) for instructing the travel direction of the vehicle. The accelerator sensor 34 is adapted to detect acceleration by sensing the force applied to the sensor per se. A pendulum type or strain-gauge type sensor, for example, can serve as the accelerator sensor 34. The brake sensor 36 is adapted to detect a manipulated variable of the brake pedal 21.

The control apparatus 30 controls the actual acceleration of the vehicle to a target value (target acceleration) in the case where, for example, a request for automatic travel is inputted by the user through the user interface 32. The details are provided below.

Figure 2:
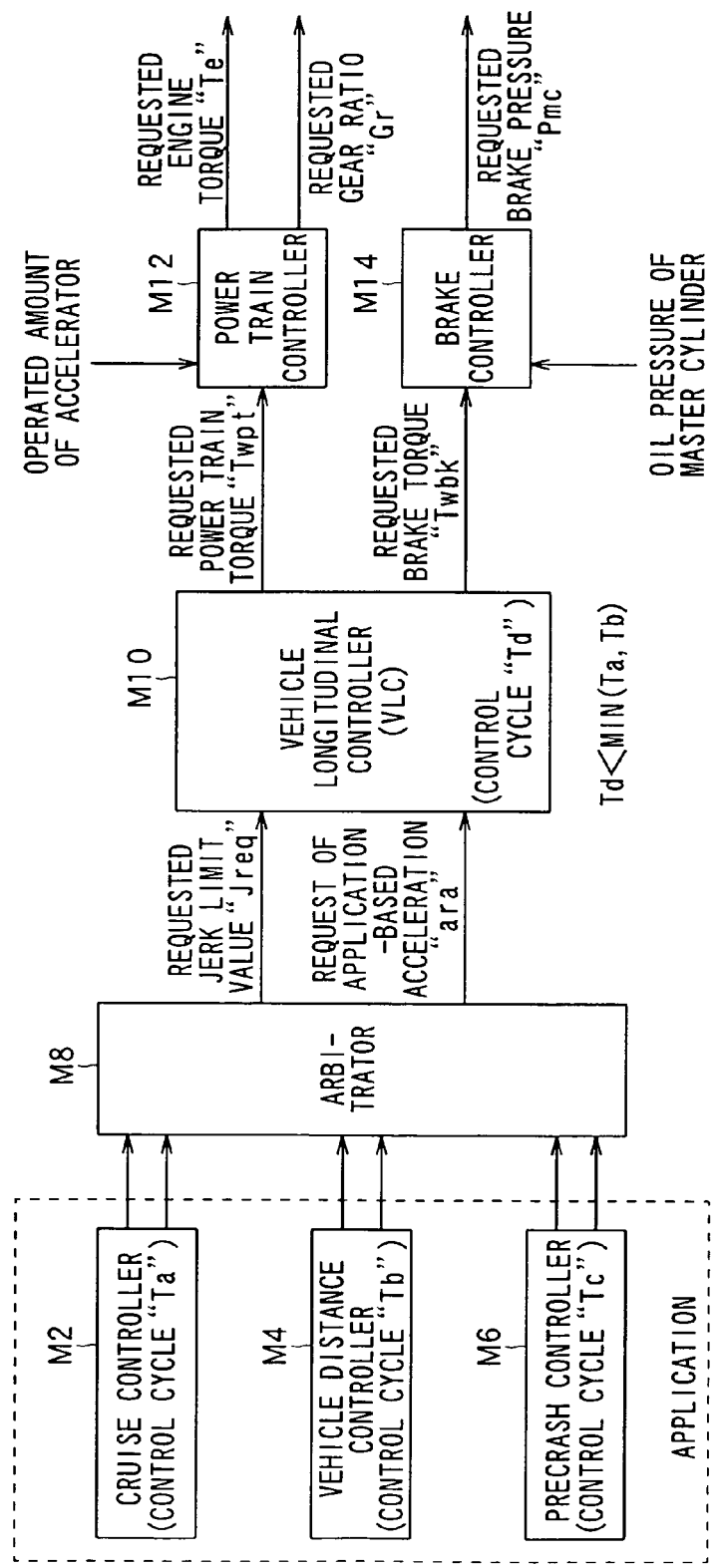
FIG. 2 is a block diagram illustrating the processes concerning automatic travel control, according to the embodiment.

FIG. 2 shows the processes associated, in particular, with the automatic travel control, among the processes performed by the control apparatus 30.

FIG. 2 exemplifies such automatic travel applications as a cruise controller M2, a vehicle distance controller M4 and a hill-start controller M6. The cruise controller M2 controls the travel speed of the vehicle to be kept at a certain level. The vehicle distance controller M4 controls the distance between the vehicle and a preceding vehicle to a predetermined distance. The hill-start controller M6 controls the vehicle to automatically bring the vehicle from a stopped state into a traveling state, on an ascending slope. The term "traveling state" here refers to a state where the vehicle is displaced to a travel direction requested by the user through the user interface 32. The cruise controller M2, the vehicle distance controller M4 and the hill-start controller M6 all output a requested value of acceleration (requested acceleration) and a requested limit value of jerk that will be described later.

An arbitrator M8 outputs a finally requested jerk limit value "Jreq" and a requested acceleration (application acceleration "ara") based on the outputs from the cruise controller M2, the vehicle distance controller M4 and the hill-start controller M6.

A vehicle longitudinal controller (VLC) M10 is configured to output: a requested power-train torque "Twpt" which is a torque requested for the power train made up of the engine 10 and the automatic transmission system 14; and a requested brake torque "Twbk" which is a torque requested for the brake actuator 20. A control cycle "Td" of the vehicle longitudinal controller M10 is different at least from a control cycle "Ta" of the cruise controller M2 and a control cycle "Tb" of the vehicle distance controller M4. Specifically, the cycle "Td" of the vehicle longitudinal controller M10 is set shorter than the cycle "Ta" of the cruise controller M2 and the cycle "Tb" of the vehicle distance controller M4. This is because the applications are adapted to calculate requested acceleration based on various detection values obtained from detecting means, such as one which detects a preceding vehicle by radar, and thus because the detection cycles of these detecting means tend to be longer than the detection cycles of actual vehicle speed and actual acceleration.

A power train controller M12 outputs a requested value of torque for the engine 10 (requested engine torque "Te"), and a requested value of gear ratio for the automatic transmission system 14 (requested gear ratio "Gr"), in response to the requested power train torque "Twpt". A brake controller M14 outputs a requested value of hydraulic oil pressure for the brake actuator 20 (requested brake pressure "Pmc"), in response to the requested brake torque "Twbk". It should be appreciated that the requested brake pressure "Pmc" is a manipulated variable of the brake actuator 20 which adjust, through the hydraulic oil pressure, the braking force in each of the drive wheels 16 and the idler wheels 18.

Figure 3:
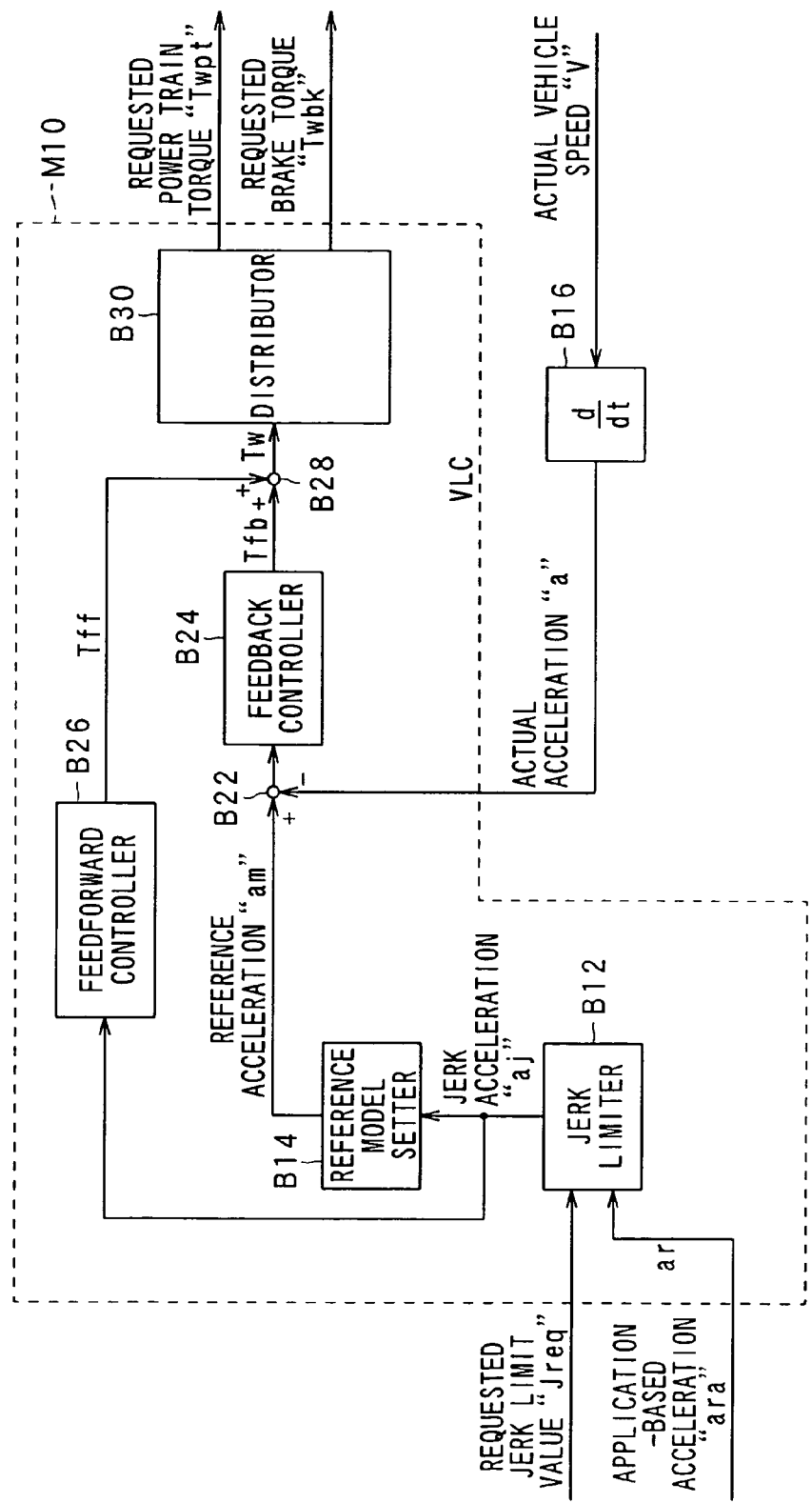
FIG. 3 is a block diagram illustrating in detail the processes performed by a vehicle longitudinal controller according to the embodiment.

FIG. 3 shows in detail the processes performed by the vehicle longitudinal controller M10.

The vehicle longitudinal controller M10 is configured to output the application acceleration "ara" derived from the arbitrator M8 to a jerk controller B12 as a requested acceleration "ar". The jerk controller B12 performs a process for limiting the amount of change in the value of the requested acceleration in one control cycle of the vehicle longitudinal controller M10, to a value equal to or less than the requested jerk limit value "Jreq".

FIG. 4 shows a series of processes performed by the jerk limiter B12. First, at step S10, the jerk limiter B12 obtains the requested acceleration "ar", the requested jerk limit value "Jreq" and a jerk acceleration "aj" that is the present output of the jerk limiter B12. At the subsequent step S12, the jerk acceleration "aj" is set as a previous value "aj0". At steps S14 and S16, the change in the requested acceleration "ar" is limited so that the difference from the previous value "aj0" will be equal to or less than the jerk limit value "Jreq". That is, at step S16, a value "aj1" is calculated, which value corresponds to a value obtained by multiplying the jerk limit value "Jreq" with the control cycle "Td" and adding the resultant value to the previous value "aj0", or corresponds to the requested acceleration "ar", whichever is smaller. At the subsequent step S16, a value "aj2" is calculated, which value corresponds to a value obtained by multiplying the jerk limit value "Jreq" with the control cycle "Td" and subtracting resultant value from the previous value "aj0", or corresponds to the smaller value "aj1" mentioned above, whichever is larger. At step S18, the larger value "aj2" is set as the jerk acceleration "aj".

Thus, in one control cycle of the applications, the jerk acceleration "aj" is shifted stepwise to the requested acceleration "ar" at every control cycle "Td" of the vehicle longitudinal controller M10, with the jerk limit value "Jreq" as being the maximum amount of change.

In the vehicle longitudinal controller M10, the vehicle acceleration is controlled to the jerk acceleration "aj" by two-degree freedom control. In particular, the actual acceleration is feedback-controlled to the jerk acceleration "aj", and at the same time, the actual acceleration is feedforward controlled to the jerk acceleration "aj". An explanation will be given first on the feedback control.

<Feedback Control>

Figure 5A:
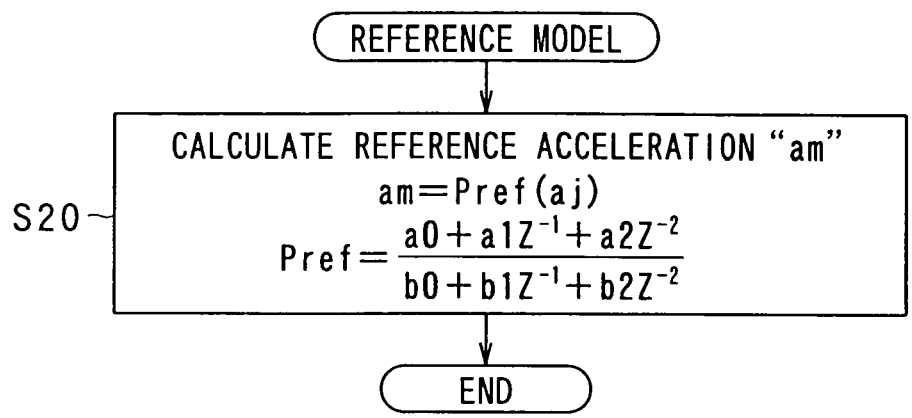
FIG. 5A is a flow diagram illustrating a procedure performed by a reference model setter.
Figure 5B:
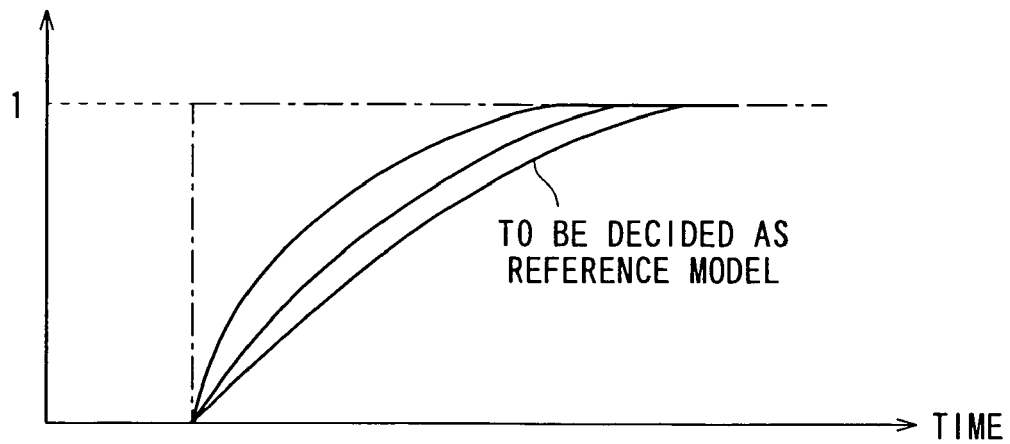
FIG. 5B is a diagram illustrating response characteristics of actual vehicle.

A reference model setter B14 shown in FIG. 3 outputs a reference acceleration "am" by converting the jerk acceleration "aj" in terms of a so reference model. The reference model is to determine a behavior of the target acceleration in a transient travel time period of the vehicle, during which the jerk acceleration "aj" changes. The process performed by the reference model setter B14 is shown in FIG. 5A as step S20. Specifically, the reference model is a primary delay model, and thus the jerk acceleration "aj" is converted in terms of the primary delay model. As shown in FIG. 5B by a dash-dot line, the primary delay model is set based on the response characteristics at the time when the response delay of the actual acceleration (solid lines) is maximized, in a step change of the target acceleration. More specifically, the response characteristics are supposed to change according to the operating conditions of the vehicle, such as the rotational speed of the engine 10. Thus, in the changing operating conditions, the characteristics at the time when the response delay is maximized are used as the base for the primary delay model.

A differential operator B16 shown in FIG. 3 performs an operation by differentiating an actual vehicle speed "V" with respect to time. The actual vehicle speed "V" is based on the detection value derived from the wheel-speed sensor 26 provided at each of the drive wheels 16 and the idler wheels 18. In particular, the actual vehicle speed "V" may, for example, be an average of the detection values of the four wheel-speed sensors 26, or a maximum value of the detection values.

A difference calculator B22 calculates the difference (difference "err") between an actual acceleration "a" outputted from the differential operator B16 and the reference acceleration "a" outputted from the reference model setter B14.

Figure 6:
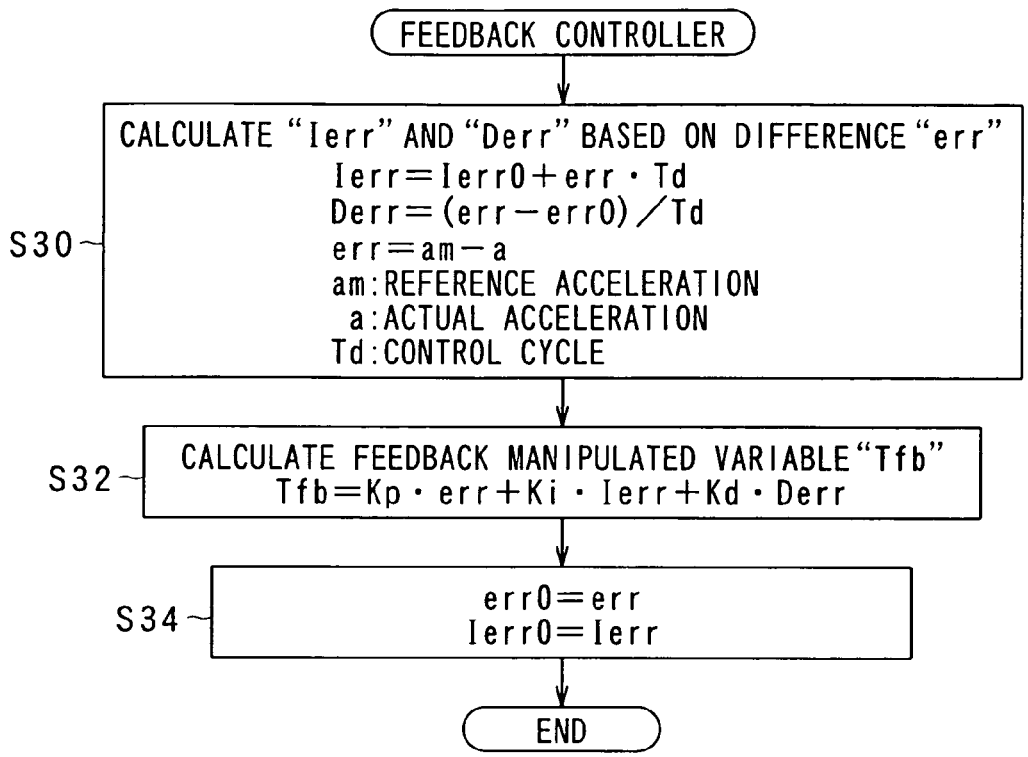
FIG. 6 is a flow diagram illustrating a procedure performed by a feedback controller.

A feedback controller B24 is adapted to feed back the actual acceleration "a" to the reference acceleration "am". In the present embodiment, in particular, the feedback controller B24 performs proportional-integral-differential (PID) control. FIG. 6 shows a series of processes performed by the feedback controller B24.

First, at step S30, an integral value "Ierr" and a differential value "Derr" are calculated based on the difference "err". Particularly, the current integral value "Ierr" is calculated by multiplying the current difference "err" with the control cycle "Td" and adding the resultant to a previous integral value "Ierr0". Also, the differential value "Derr" is calculated by subtracting a previous difference "err0" from the current difference "err" and dividing the resultant by the control cycle "Td". At the subsequent step S32, a feedback manipulated variable "Tfb" is calculated. Particularly, the feedback manipulated variable "Tfb" is calculated by summing up: a value obtained by multiplying the difference "err" with a proportional gain "Kp"; a value obtained by multiplying the integral value "Ierr" with an integral gain "Ki"; and a value obtained by multiplying the differential value "Derr" with a differential gain "Kd". The proportional gain "Kp", the integral gain "Ki" and the differential gain "Kd" are for converting the integral value "Ierr" and the differential value "Derr" into the requested torque. In other words, the feedback manipulated variable "Tfb" represents a torque requested for rendering the actual acceleration "a" to be the reference acceleration "am". When the process of step S32 is completed, the difference "err" is stored, at step S34, as the previous difference "err0" and the integral value "Ierr" is stored as the previous integral value "Ierr0".

<Feedforward Control>

Hereinafter is explained the feedforward control in the two-degree freedom control mentioned above.

Figure 7:
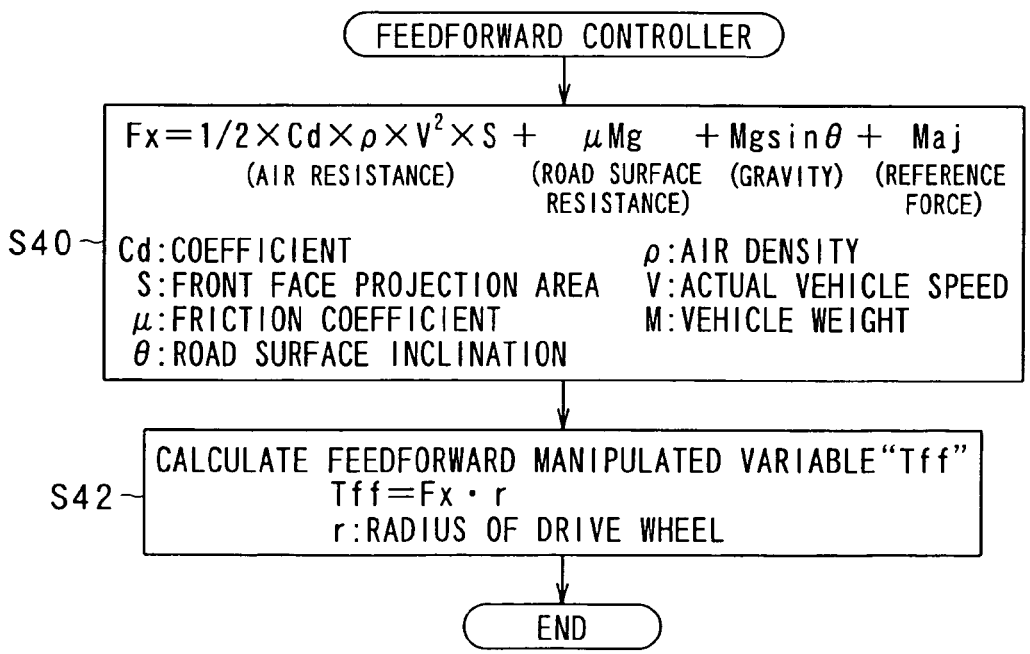
FIG. 7 is a flow diagram illustrating a procedure performed by a feedforward controller.

A feedforward controller B26 shown in FIG. 3 performs the feedforward control to achieve the jerk acceleration "aj". FIG. 7 shows a series of processes performed by the feedforward controller B26.

First, at step S40, a force "Fx" is calculated, which should be added to the travel direction of the vehicle to achieve the jerk acceleration "aj". At this step, the force "Fx" is calculated as a sum of air resistance, road surface resistance, gravity and reference force. The reference force can be obtained by multiplying the jerk acceleration "aj" with a vehicle weight "M". The reference force is necessary for having the vehicle traveled at the jerk acceleration "aj" in the state where no resistance is added in traveling the vehicle. The air resistance is a force of air, which is added in the direction reverse of the travel direction of the vehicle. In the present embodiment, the air resistance is calculated by multiplying the square of the actual vehicle speed "V" with an air density "ρ", a coefficient "Cd" and a projection area "S" of the vehicle front, followed by multiplication with "½". The road surface resistance is a resistance caused by the friction between the road surface and the drive wheels 16 and the idler wheels 18, and is calculated by the multiplication of a friction coefficient "μ", the vehicle weight "M" and a gravity acceleration "g". The term "gravity" refers to a gravity which is applied to the travel direction of the vehicle, or its inverse direction, when the road surface is inclined. This "gravity" can be expressed by "Mg sin θ" using a road surface gradient "θ". It should be appreciated that the road surface gradient "θ" is calculated based on the actual vehicle speed "V" and the detection value of the acceleration sensor 34 mentioned above.

At the subsequent step S42, a feedforward manipulated variable "Tff" is calculated by multiplying the force "Fx" with a radius "r" of the drive wheel 16. The feedforward manipulated variable "Tff" is the torque requested for having the vehicle traveled at the jerk acceleration "aj".

An axle torque calculator B28 shown in FIG. 3 calculates a requested axle torque "Tw" by adding the feedback manipulated variable "Tfb" to the feedforward manipulated variable "Tff".

A distributor B30 is configured to divide (distribute) the requested axle torque "Tw" into the requested power train torque "Twpt" and the requested brake torque "Twbk". Thus, the wheels (drive wheels 16 and idler wheels 18) can be imparted with drive torque and braking force which are appropriate for controlling the actual acceleration of the vehicle to the requested acceleration "ar". In particular, the actual acceleration of the vehicle can be controlled to the jerk acceleration "aj". Also, when the jerk acceleration "aj" varies, the actual acceleration can be adequately controlled to the reference acceleration "am". In other words, in the case where the acceleration of the vehicle is feedforward-controlled to the jerk acceleration "aj" while the jerk acceleration "aj" varies, the actual acceleration will have a response delay from the variation of the jerk acceleration "aj" because of the response delay of the vehicle. The actual acceleration assumed from the response delay, however, can be approximated by the reference acceleration "am". Then, with the feedback control, the actual acceleration can be controlled to the reference acceleration "am" with high accuracy.

<Hill-Start Control>

Hereinafter, a detailed explanation is given on the processes performed by the hill-start controller M6.

When the control of the hill-start controller M6 is effected, instructions for automatic travel are yet to be given through the user interface 32. Thus, under the control of the hill-start controller MG, the vehicle is operated by the tradeoffs between the user's manipulation of the accelerator pedal and the brake pedal. For this reason, the user's manipulated variable of the accelerator is also inputted to the power train controller M12 shown in FIG. 2. In addition, a detection value derived from the hydraulic sensor 23 in response to the user's manipulated variable of the brakes is also inputted to the brake controller M14 shown in FIG. 2. Thus, in the power train controller M12, the requested engine torque "Te" and the requested gear ratio "Gr" are outputted based on either the user's requested acceleration torque corresponding to the user's manipulated variable of the accelerator, or the requested power train torque "Twpt", whichever is larger. Also, in the brake controller M14, the requested brake pressure "Pmc" is outputted in the case where the user's requested brake torque corresponding to the detection value of the hydraulic sensor 23 has a larger negative value (i.e. has a smaller absolute value) than the requested brake torque "Twbk".

Figure 8:
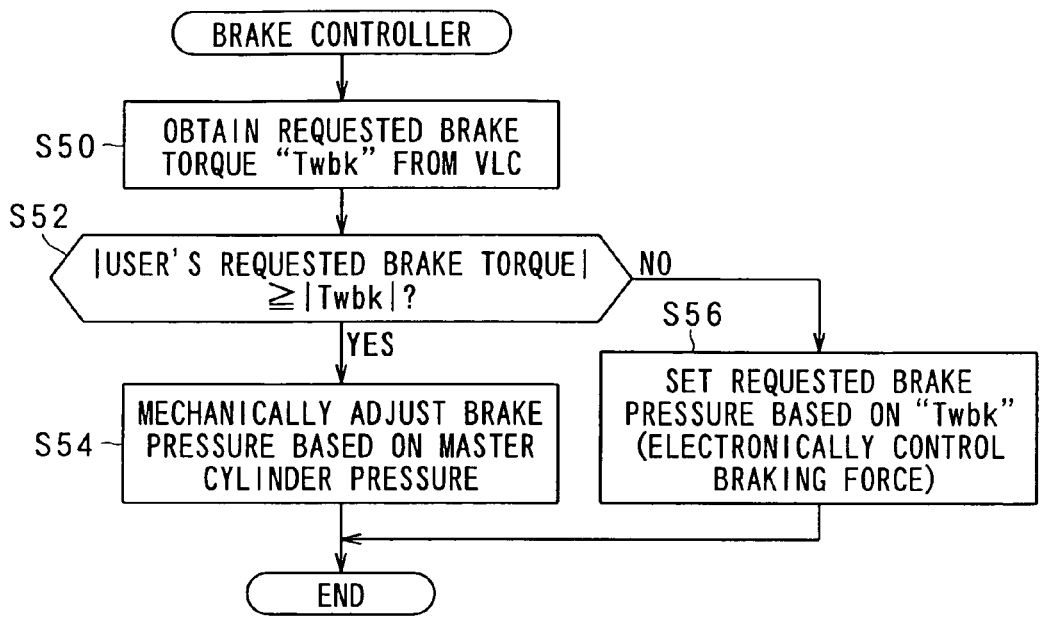
FIG. 8 is a flow diagram illustrating a procedure performed by a brake controller, according to the embodiment.

FIG. 8 is a flow diagram illustrating a series of processes for setting the requested brake pressure "Pmc". These processes are repeatedly executed at a predetermined cycle, for example.

First, at step S50, the requested brake torque "Twbk" is retrieved from the vehicle longitudinal controller M10. At the subsequent step S52, it is determined whether or not the absolute value of the user's requested brake torque corresponding to the detection value of the hydraulic sensor 23 is equal to or more than the absolute value of the requested brake torque "Twbk". If an affirmative determination is made at step S52, control proceeds to step S54 where the pressure in each wheel cylinder 24 is mechanically adjusted based on the pressure of the hydraulic oil in the master cylinder 22. In other words, the pressure adjustment in each wheel cylinder 24 is not electronically controlled (the braking force manipulation is not electronically controlled). On the other hand, if a negative determination is made at step S52, control proceeds to step S56 where the requested brake pressure "Pmc" is set based on the requested brake torque "Twbk". When the process at step S54 or S56 is completed, the series of processes are temporarily ended.

Figure 9:
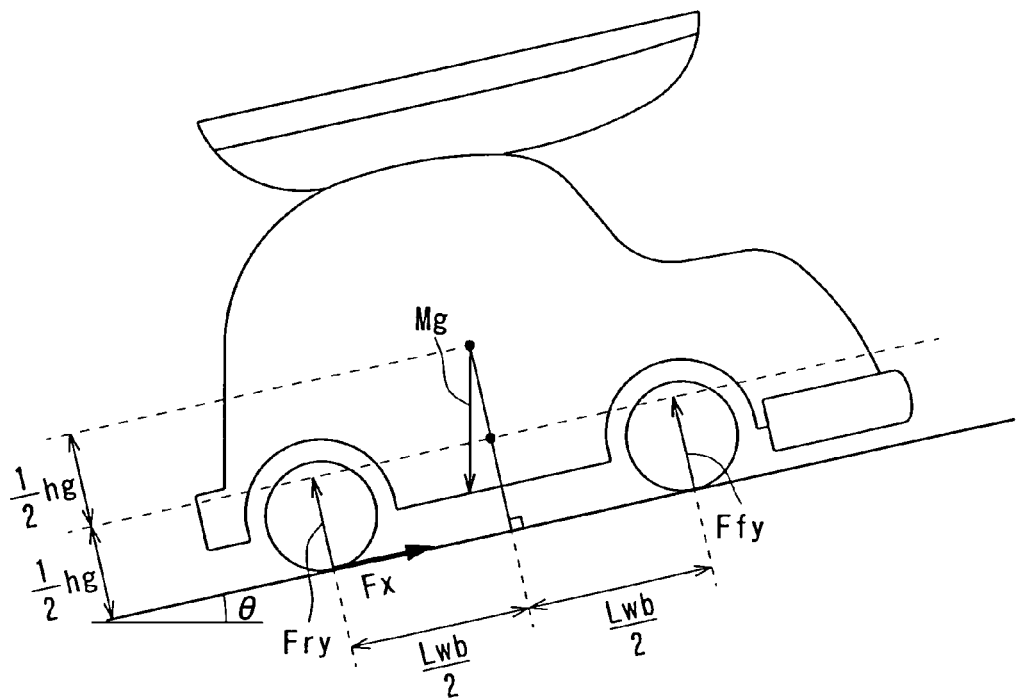
FIG. 9 illustrates forces exerted on a vehicle.

Hereinafter is explained the way of setting the acceleration (hill-start acceleration "as1") outputted from the hill-start controller M6. FIG. 9 illustrates forces exerted on a vehicle on an ascending slope. As shown, the vehicle is subjected to a gravity "Mg", a vertical effectiveness "Fry" exerted on the drive wheels 16, a vertical effectiveness "Ffy" exerted on the idler wheels 18 and a motive force "Fx" exerted on the drive wheels 16. The figure also indicates the gradient "θ" and a distance "hg" from the road surface to the center of gravity. In the figure, indicated by "Lwb" is the distance between the rotary shafts of the drive wheels 16 and the idler wheels 18. The line perpendicularly extended from the center of gravity to the road surface (normal line) is assumed to divide the distance "Lwb" into half.

A balance perpendicular to the road surface can be expressed by the following Formula (c1):

$$Mg \cdot \cos\theta = Fry + Ffy \quad \text{(c1)}$$

A balance of the moment exerted on the middle point of the normal line between the center of gravity and the road surface can be expressed by the following Formula (c2):

$$hg \cdot Mg \cdot \sin\theta/2 + hg \cdot Fx + Lwb \cdot Ffy/2 = Lwb \cdot Fry/2 \quad \text{(c2)}$$

When the vertical effectiveness "Ffy" is eliminated from Formula (c2) using Formula (c1), the following Formula (c3) is established:

$$Fry = Mg(\cos\theta + hg \cdot \sin\theta/Lwb)/2 + hg \cdot Fx/2Lwb \quad \text{(c3)}$$

Using the friction coefficient "μ" between the road surface and the drive wheels 16, the friction acted on the drive wheels 16 are expressed by "μFry". The friction "μFry" is the upper limit of the driving force "Fx", at which the drive wheels 16 will not lock or skid on the road. Thus, in order that the drive wheels 16 will not lock or skid, a relation expressed by "Fx ≤ μFry" should be satisfied. Calculating the upper limit of the hill-start acceleration "as1" using this relation, the following Formula (c4) is established.

$$as1 = \frac{(Fx - Mg \cdot \sin\theta)}{M} \leq \frac{Lwb \cdot \mu \cdot g \cdot \cos\theta}{(2Lwb - \mu \cdot hg)} + \frac{(2\mu \cdot hg - 2Lwb)\sin\theta}{(2Lwb - \mu \cdot hg)} \quad \text{(c4)}$$

Figure 10:
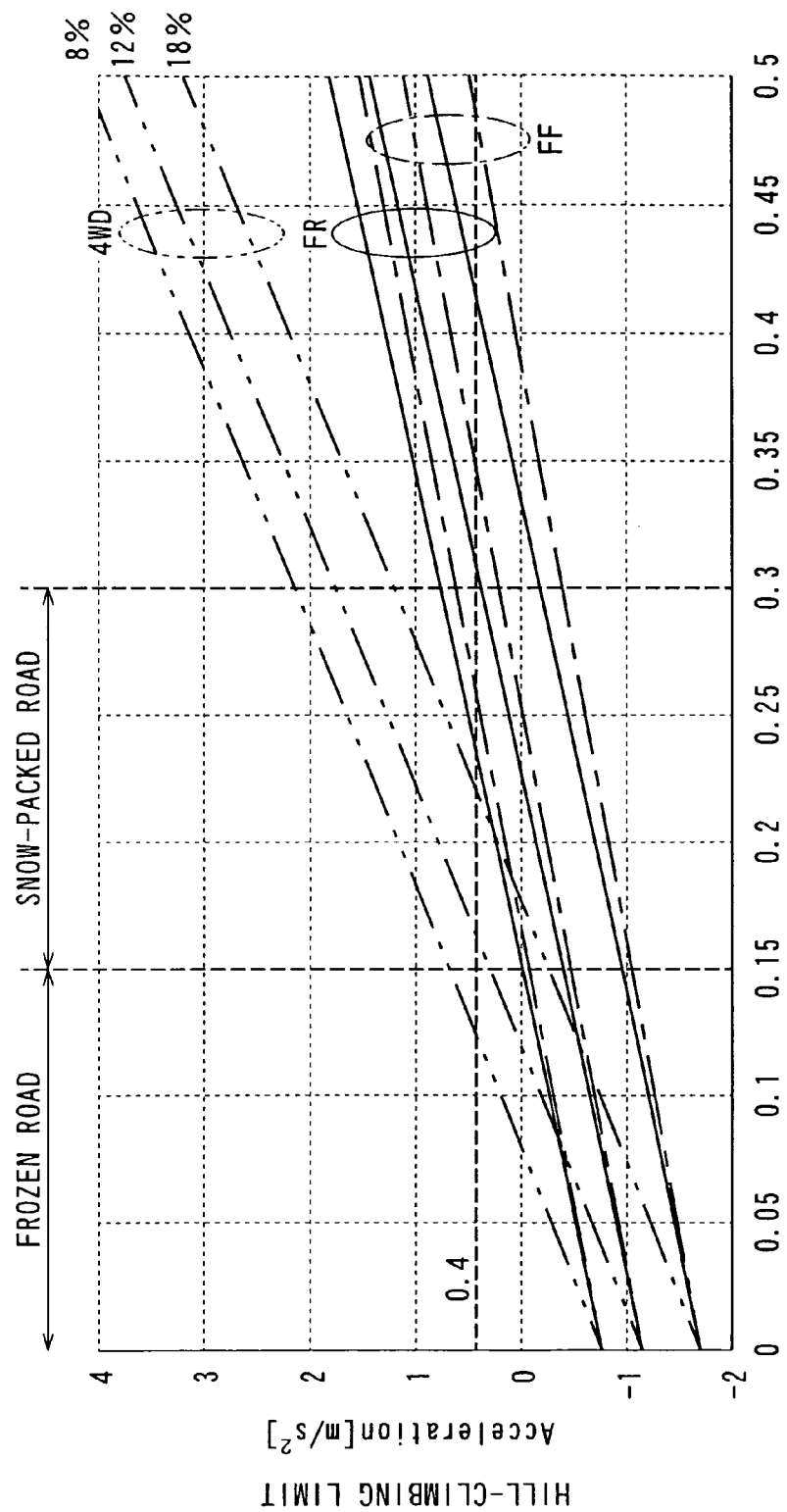
FIG. 10 illustrates gradient and friction coefficient of an ascending slope, relative to critical acceleration on the ascending slope.

Solid lines in FIG. 10 indicate upper limits (hill-climbing limits) of acceleration that will not cause locking or skidding, according to the road surface gradient "θ" (8%, 12% and 18% in the figure) and the friction coefficient "μ". The upper limits have been calculated based on the above Formula (c4). As shown in the figure, as the friction coefficient "μ" becomes smaller, the hill-climbing limit becomes smaller. Also, as the gradient of the road surface becomes steeper, the hill-climbing limit becomes smaller. In FIG. 10, dash-dot lines indicate the hill-climbing limits calculated in the manner explained above for front-wheel-drive vehicles. Also, dash-dot-dot lines indicate the hill-climbing limits calculated in the manner explained above for four-wheel drive vehicles. In either of the cases, the hill-climbing limits become smaller as the friction coefficient "μ" becomes smaller and as the road surface gradient becomes steeper.

Accordingly, the hill-start controller M6 sets the hill-start acceleration "as1" smaller as the friction coefficient "μ" becomes smaller and as the road surface gradient becomes steeper. The details of the processes performed by the hill-start controller M6 are provided below.

Figure 11:
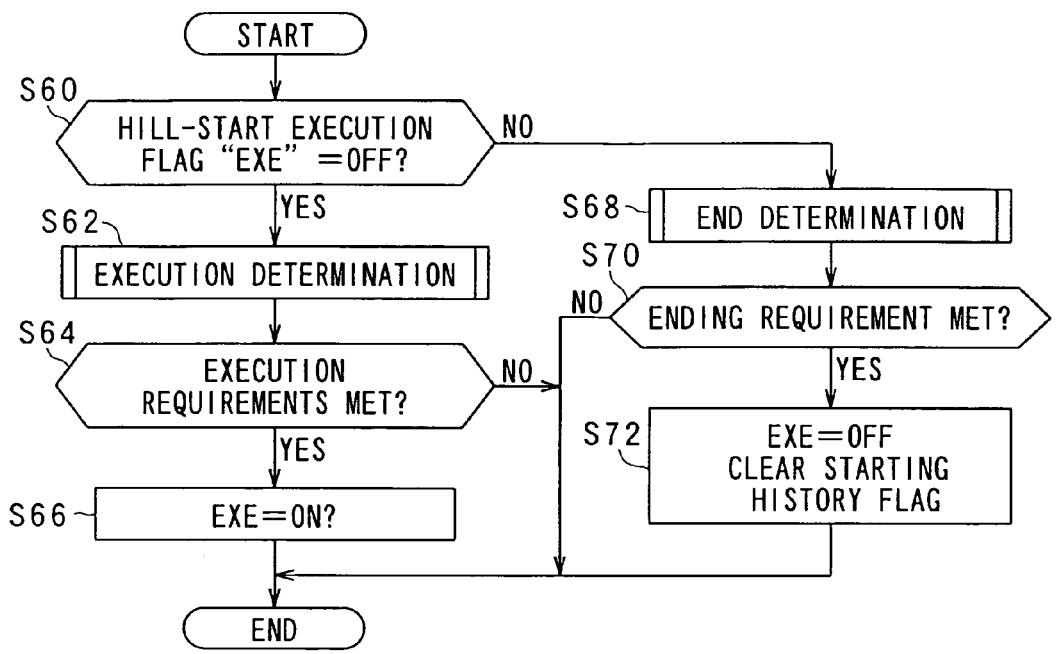
FIG. 11 is a flow diagram illustrating a hill-start procedure, according to the embodiment.

FIG. 11 is a flow diagram illustrating a series of processes for is hill-start control.

Figure 12:
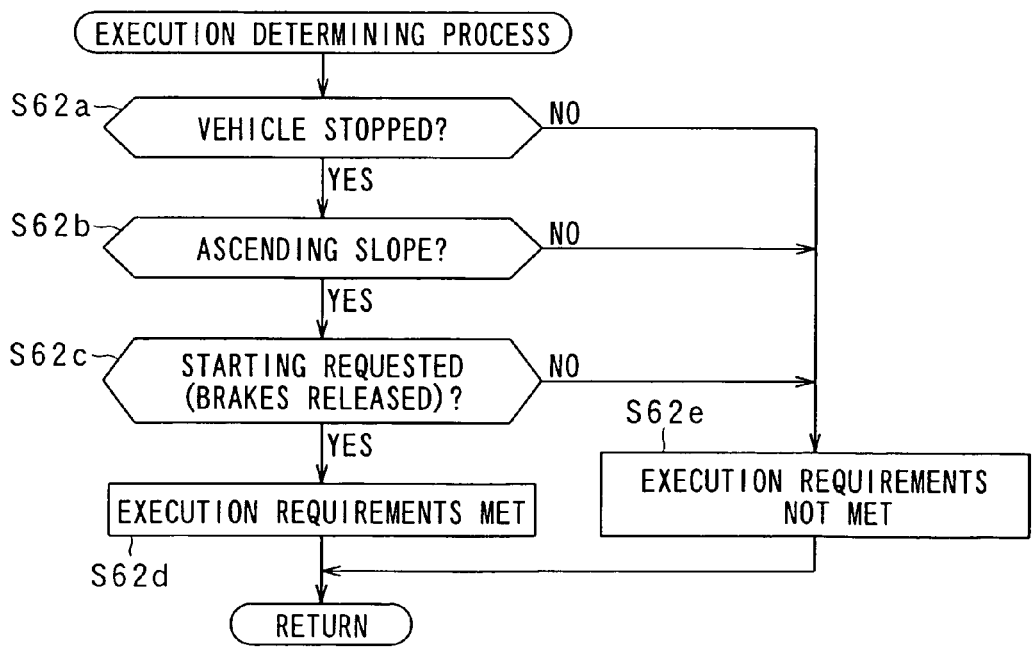
FIG. 12 is a flow diagram illustrating a procedure for determining the execution of the hill-start procedure.

First, at step S60, it is determined whether or not a hill-start execution flag "EXE" is in an off-state. The flag "EXE"

indicates that the hill-start control will be started. If the flag "EXE" is determined as being in an off-state, control proceeds to step S62 where an execution determination is made to determine whether or not the hill-start control is to be executed. This process is specifically indicated in FIG. 12.

Specifically, if the requirements that the vehicle is in a stopped state ("YES" at step S62a), that the vehicle is on an ascending slope ("YES" at step S62b) and that the vehicle has been requested to start ("YES" at step S62c) are all met, execution requirements are determined as having been met (step S62d). If even any one of the requirements is not met, the execution requirements are determined as not having been met (step S62e). The determination on whether or not the vehicle is on an ascending slope is made based on the road surface gradient "θ" and the travel direction instructed by the user interface 32. In particular, in the case where the front wheels are positioned higher than the rear wheels and if forward movement has been instructed by the shift lever or the like of the user interface 32, for example, the road is determined to be an ascending slope. If backward movement has been instructed, the road is determined not to be an ascending slope. In the present embodiment, the determination on the presence of the request for starting the vehicle is made depending on whether or not the brake pedal 21 has been released. Completing the process at step S62d or S62e means that the process at step S62 of FIG. 11 has been completed.

At step S64 of FIG. 11, a determination is made as to whether or not the execution requirements have been met. If the execution requirements are determined as having been met, control proceeds to step S66 where the hill-start execution flag "EXE" is turned on.

Figure 13:
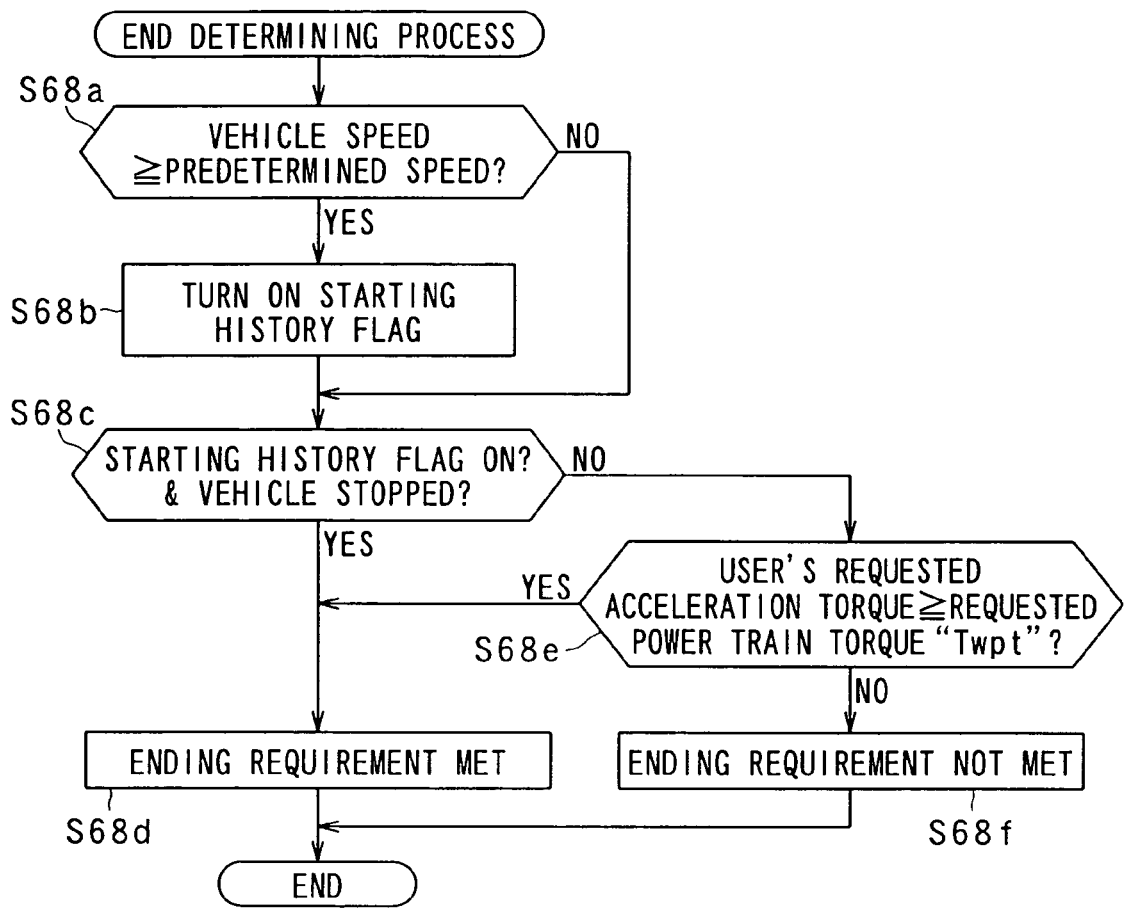
FIG. 13 is a flow diagram illustrating a procedure for determining the stoppage of the hill-start procedure.

If a negative determination is made at step S60, control proceeds to step S68 where it is determined whether or not the hill-start control is to be ended. A series of processes for this determination are specifically shown in FIG. 13.

First at step S68a, a determination is made as to whether or not the vehicle speed "V" is equal to or more than a predetermined speed. This process is purposed to determine whether or not the vehicle has turned to a traveling state through the hill-start control. The predetermined speed is set to a level that, once the set speed has been reached, the vehicle speed is considered no longer be zeroed again by a control error, for example, during the hill-start control. In other words, the predetermined speed is set to a level at which the vehicle can be determined to be reliably in the process of displacement to the travel direction. If the vehicle speed "V" is determined to be equal to or more than the predetermined speed, control proceeds to step S68b where a starting history flag is turned on to indicate that the vehicle has been brought into a traveling state through the hill-start control.

When a negative determination is made at step S68a or when the process of step S68b is completed, control proceeds to step S68c where it is determined whether or not the starting history flag is turned on and the vehicle is in a stopped sate. This process is purposed to determine whether or not the requirements for stopping the hill-start control have been met. Specifically, in the case where the starting history flag is turned on and the vehicle is in a stopped state, the vehicle is considered to have once turned to a traveling state and then have been stopped by the user's manipulation of the brake pedal. In this case, it is considered that the user has a desire of stopping the vehicle, and thus it is determined that the requirements for ending the hill-start control have been met (step S68d).

On the other hand, if a negative determination is made at step S68c, control proceeds to step S68e where it is determined whether or not the user's requested acceleration torque corresponding to the user's manipulated variable of the accelerator is equal to or more than the requested power train torque "Twpt". This process is also purposed to determine whether or not the requirements for stopping the hill-start control have been met. In particular, in the case where the user's requested acceleration torque is equal to or more than the requested power train torque "Twtp", the user per se is considered to have a desire of running the vehicle, and thus it is determined that the requirements for ending the hill-start control have been met (step S68d). In the case where the user's requested acceleration torque is less than the requested power train torque "Twp", it is determined that the requirements for ending the hill-start control have not been met (step S68f). Completing the process of step S68d or S68f means that step S68 of FIG. 11 has been completed.

At step S70 or FIG. 11, a determination is made as to whether or not the requirements for ending the hill-start control have been met. If an affirmative determination is made, control proceeds to step S72 where the hill-start execution flag "EXE" is turned on and the starting history flag is cleared. If a negative determination is made at step S64 or S70, or when the process at step S66 or S72 is ended, the series of processes is temporarily ended.

Figure 14:
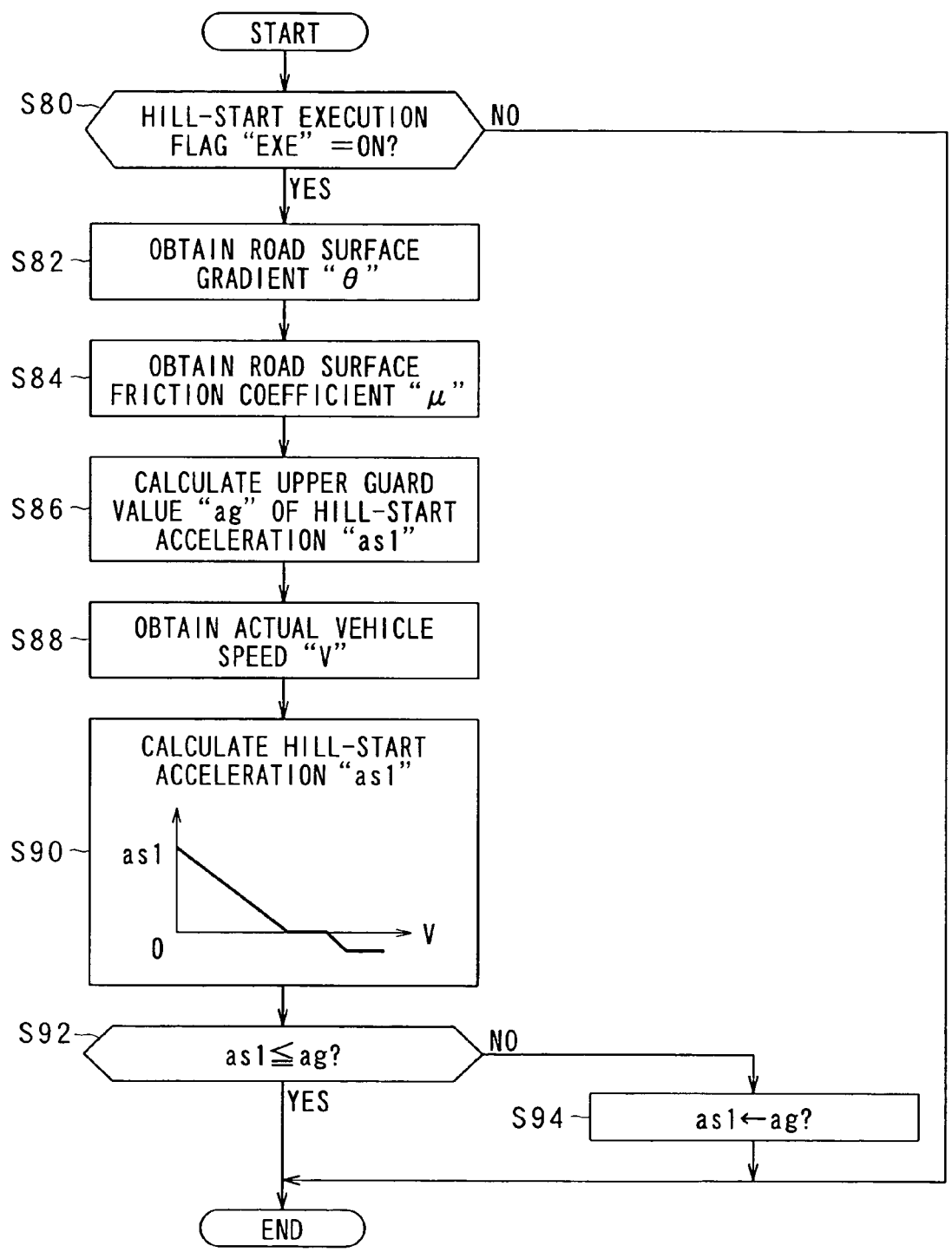
FIG. 14 is a flow diagram illustrating the details of the hill-start procedure, according to the embodiment.

FIG. 14 is a flow diagram illustrating in detail a series of processes for the hill-start control. These processes are repeatedly executed at a predetermined cycle, for example.

First at step S80, it is determined whether or not the hill-start execution flag "EXE" is in an on-state. If an affirmative determination is made at step S80, control proceeds to S82 where the road surface gradient "θ" is obtained. At the subsequent step S84, the friction coefficient "μ" between the road surface and the wheels is obtained. In the present embodiment, as shown in FIGS. 15A to 15C, the friction coefficient "μ" is obtained based on the operational conditions of an antilock brake system (ABS) and the operational conditions of a traction control system (TRC) up until the point when the vehicle is stopped. FIG. 15A illustrates the transition of the actual acceleration "a"; FIG. 15B illustrates transition of the operational conditions of the ABS and TRC. FIG. 15C illustrates transition of the friction coefficient "μ". The acceleration at the time when the ABS and the TRC are in operation is a critical acceleration that will cause locking or skidding, and thus the friction coefficient "μ" can be calculated based on the acceleration at this time. However, for example, the friction coefficient "μ" may vary depending on the positions on the road surface, and noises may be superposed on the actual acceleration "a". Considering these points, a mitigation process is applied to the calculation of the friction coefficient "μ" to mitigate the variation in the calculated values. This process can be performed by giving a weighted average process, for example, in respect of the current and previous calculated values of the friction coefficient which is directly calculated from the actual acceleration "a".

At the subsequent step S86, an upper limit guard value "ag" of the hill-start acceleration "as1" is calculated based on Formula (c4). Then, at step S88, the actual vehicle speed "V" is obtained. At step S90, the hill-start acceleration "as1" is calculated based on the actual vehicle speed "V". As shown in FIG. 14, the hill-start acceleration "as1" is ensured to be decreased as the vehicle speed is increased. A dead zone where the hill-start acceleration "as1" stands zero is provided in a region where the vehicle speed is equal to or larger than a predetermined speed. When the vehicle speed becomes larger than that in the dead zone, the hill-start acceleration "as1" is ensured to have a negative value. This setting is designed to prevent the hindrance of vehicle start in case the user may step on the brake pedal when the vehicle speed becomes excessively high.

At the subsequent step S92, it is determined whether or not the hill-start acceleration "as1" is equal to or less than the upper limit guard value "ag". If a negative determination is made at step S92, control proceeds to step S94 where the hill-start acceleration "as1" is set to the upper limit guard value "ag".

When a negative determination is made at step S80 or when an affirmative determination is made at step S92 or when the process at step S94 is completed, the series of processes is temporarily ended.

Figure 16:
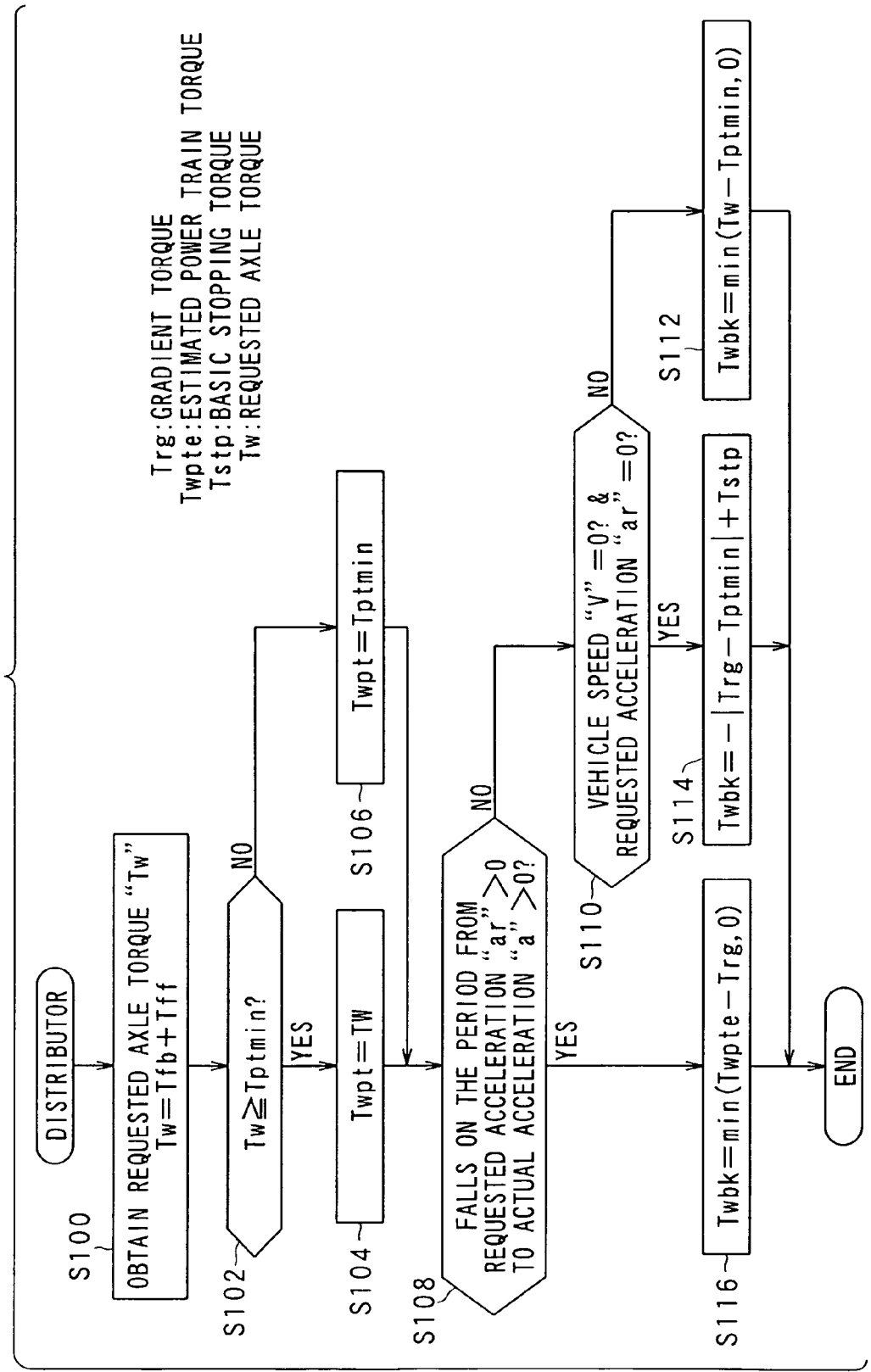
FIG. 16 is a flow diagram illustrating a procedure performed by a distributor in the vehicle longitudinal controller.

As described above, by setting the hill-start acceleration "as1", the vehicle can be automatically brought into a traveling state without having the vehicle locked or skidded. However, even when the requested axle torque "Tw" is set based on the hill-start acceleration "as1", the controllability of the hill-start control may be deteriorated by the response delay in the torque actually produced by the power train. In this regard, this problem may be avoided by having the distributor B30 carried out the series of processes of FIG. 16.

First, at step S100, the requested axle torque "Tw" is obtained. At the subsequent step S102, it is determined whether or not the requested axle torque "Tw" is equal to or more than a minimum torque "Tptmin". This process is purposed to determine whether or not the requested axle torque "Tw" can be produced only by the power train. The minimum torque "Tptmin" is set to be the minimum torque that can be realized by the engine 10 and the automatic transmission system 14. If the requested axle torque "Tw" is equal to or more than the minimum torque "Tptmin", it is determined that the requested axle torque "Tw" can be realized only by the power train, and then control proceeds to step S104. At step S104, the requested power train torque "Twpt" is set to be the requested axle torque "Tw". On the other hand, if a negative determination is made at step S102, the requested axle torque "Tw" is determined as cannot be realized by only the power train, and then control proceeds to step S106. At step S106, the requested power train torque "Twpt" is set to be the minimum torque "Tptmin".

When the process of S104 or S106 is completed, it is determined, at step S108, whether or not the vehicle is in a period that lies between the point when the requested acceleration "ar" has become larger than zero and the point when the actual acceleration "ar" becomes larger than zero. This process is purposed to determine the period from when the hill-start control is started, over the transition of the vehicle from the stopped state into the traveling state. If a negative determination is made at step S108, control proceeds to step S110. At step S110, a determination is made as to whether or not the vehicle speed "V" is zero and the requested acceleration "ar" is zero. This process is purposed to determine whether or not the vehicle has been instructed to be in a stopped state and is actually in a stopped state. If a negative determination is made at step S110, control proceeds to step S112 where the requested brake torque "Twbk" is set to be either the value obtained by subtracting the minimum torque 'Tptmin' from the requested axle torque "Tw", or zero, whichever is smaller.

On the other hand, if an affirmative determination is made at step S110, control proceeds to step S114 where the requested brake torque 'Twbk' is set to be the sum of the negative value of the absolute value of the difference between the minimum torque "Tptmin" and a gradient torque "Trg", and the value of a basic stopping torque "Tstp". The gradient torque "Trg" (>0) is calculated based on the road surface so gradient "θ" The gradient torque "Trg" is a torque requested for balancing the components of the gravity, which components are directed opposite to the travel direction of the vehicle. The basic stopping torque "Tstp" (<0) is a margin torque for retaining the vehicle in a stopped state. According to this process, the torque requested for stopping the vehicle can be constantly generated, irrespective of the magnitude of the minimum torque "Tptmin" generated by the power train and the gradient torque "Trg".

On the other hand, if an affirmative determination is made at step S108, control proceeds to step S116. At step S116, the requested brake torque "Twbk" is set to be either the value obtained by subtracting the gradient torque "Trg" from an estimated power torque "Twpte" which is estimated as being generated by the power train, or zero, whichever is smaller. This process is purposed to avoid the displacement of the vehicle in a direction opposite to the travel direction, in effecting the hill-start control.

Upon output of the hill-start acceleration "as1" from the hill-start controller M6, the vehicle longitudinal controller M10 calculates the requested axle torque "Tw" based on the output. The requested axle torque "Tw" is calculated based on the feedforward manipulated variable "Tff", and thus should be the torque requested to serve as the hill-start acceleration "as1", cancelling the effect of the gravity induced by the road surface gradient "θ". However, even when the requested power train torque "Twpt" corresponding to the requested axle torque "Tw" is set, a response delay may be caused before the torque actually generated by the power train follows up the increase in the requested power train torque "Twpt". Accordingly, immediately after the release of the brakes and the start of the hill-start control, the torque generated by the power train is not only insufficient as being the hill-start acceleration "as1" but also insufficient for preventing the vehicle from being displaced in a direction opposite to the travel direction. In this case, immediate zeroing of the requested brake torque "Twbk" may allow the vehicle to be displaced in the direction opposite to the travel direction.

In this regard, the present embodiment calculates the estimated power train torque "Twpte" reflecting the response delay of the torque actually generated by the power train in response to the variation in the requested power train torque "Twpt". When the calculated value is insufficient for the gradient torque "Trg" the insufficiency is compensated by the braking force of the brake actuator 20. Thus, in the hill-start control, the vehicle can be prevented from being displaced in the direction opposite to the travel direction, before the vehicle is brought into the traveling state from the stopped state.

When the processes of steps S112 to S116 are completed, the series of processes is temporarily ended.

By comparison, FIG. 17 illustrates a procedure for calculating the estimated power train torque "Twpte".

An engine shaft torque estimator B40 is configured to receive input of parameters for determining operational conditions of the engine to for calculation of an estimated engine shaft torque. The inputted parameters include rotational speed, suction air quantity, rotational phase difference between the intake-side cam angle and crank angle (intake VCT (variable-cam timing)), and rotational phase difference between the exhaust-side cam angle and crank angle (exhaust VCT (variable-cam timing)).

An ignition timing corrector B42 is configured to calculate a correction coefficient for correcting the estimated engine shaft torque, based on ignition timing. A corrector B44 uses the correction coefficient calculated by the ignition timing corrector B42 to correct the estimated engine shaft torque calculated by the engine shaft torque estimator B40. An engine shaft torque estimator B46 is configured to calculate an estimated engine shaft torque by adding a lost torque to the output of the corrector B44.

A speed ratio calculator B48 is configured to calculate a ratio of the rotational speed of the engine 10 to the turbine rotational speed of the torque converter. A torque ratio calculator B50 is configured to calculate a ratio of the torque (torque ratio) outputted from the torque converter to the shaft torque of the engine 10, based on the ratio of the rotational speeds mentioned above. A converter shaft torque calculator B52 is configured to calculate the torque outputted from the torque converter, based on the estimated engine shaft torque and the torque ratio. An estimated power train torque calculator B54 is configured to calculate the estimated power train torque "Twpte" by correcting the torque outputted from the torque converter with the gear ratio of the transmission.

FIGS. 18A to 18H illustrate a mode of the hill-start control described above. Particularly, FIG. 18A illustrates transition of the vehicle speed. FIG. 18B illustrates transition of the actual acceleration. FIG. 18C illustrates transition of the drive torque imparted to the drive wheels 16 by the power train. FIG. 18D illustrates transition of the brake torque (" . . . Twbk") imparted to the wheels by the brake actuator 20. The dash-dot line in FIG. 18D indicates the brake torque corresponding to the user's manipulation of the brake pedal 21.

As shown in FIGS. 18A to 18D, when the user releases the brake pedal at time "t1" the hill-start control is started. In this case, the brake torque is decreased as the drive torque is increased. Accordingly, the sum of the brake torque and the drive torque balances the gradient torque "Trg", which can prevent the vehicle from displacing in the direction opposite to the travel direction. At time "t2" when the vehicle starts displacing in the travel direction (when the vehicle is transited into the traveling state), the drive torque becomes equal to or larger than the gradient torque "Trg" and the brake torque is zeroed. Thus, when the actual vehicle speed exceeds zero, the drive torque can be sufficiently utilized unlike the state where the traveling of the vehicle is prevented by the brake torque. In addition, since the actual acceleration is limited so as to be equal to or less than the upper limit so guard value "ag", the locking or skidding of the wheels can also be adequately prevented. Therefore, in the state where, for example, the vehicle travels on a snow-packed road, the vehicle can be adequately transited into the traveling state without causing locking or skidding to the wheels.

At time "t3" when the user may again manipulate the brake pedal 21 to issue braking instructions, the power train generates the drive torque to realize the hill-start acceleration "as1". As a result, the vehicle speed is slightly decreased in response to the user's manipulation of the brake pedal. Thus, upon user's release of the brake pedal again, the vehicle can continue traveling without allowing the vehicle to stop.

On the other hand, FIGS. 19A to 19D illustrate the case where the ending requirement of the hill-start control is met when the user steps on the brake pedal 21. In this case, when the brake pedal is lightly pressed by the user, the operation of the power train under the hill-start control is stopped to thereby drastically decrease the drive torque. Thus, depending on the user's braking manipulation, the braking force sufficient to balance the gradient torque "Trg" may not be generated to thereby drastically decrease the vehicle speed. In this case, the user may press hard on the brake pedal 21 in order that the vehicle can be prevented from displacing in the direction opposite to the travel direction, which resultantly stops the vehicle. For this reason, the vehicle cannot be brought into the state of traveling.

According to the present embodiment described above in detail, the following advantages can be obtained.

(1) In the case where there are components in the gravity exerted on the vehicle, which are directed to the direction opposite to the travel direction, the power train operation has been continued for the hill-start control, irrespective of the user's manipulation of the brake pedal after commencement of the hill-start control. Thus, comparing with the case where the hill-start control is ended by the manipulation of the brake pedal, the torque to be imparted to the drive wheels 16 can be prevented from being drastically decreased.

(2) The hill-start control has been ended in the case where the vehicle speed has once become equal to or higher than a predetermined speed and then has been zeroed. Thus, before ending the hill-start control, the state of the vehicle can be adequately grasped as to whether or not the hill-start control is requested to be ended.

(3) In the case where the user's requested acceleration torque exceeds the requested power train torque, the hill-start control has been ended. Thus, the hindrance of the user's request can be adequately avoided, which hindrance would have been caused by the hill-start control.

(4) In effecting the hill-start control, the power train has been allowed to generate torque for overcoming the components in the gravity, which are directed to the direction opposite to the travel direction. The torque generated by the power train, however, may be drastically decreased if the hill-start control is stopped by the user's brake pedal manipulation. Accordingly, the advantages of the above items (1) to (3) can be particularly exerted in a preferable manner.

(5) The actual acceleration of the vehicle has been feedforward-controlled to the target acceleration (hill-start acceleration "as1") by operating the power train based on the components in the gravity, which are directed to the direction opposite to the travel direction. Thus, the power train is allowed to generate the torque for overcoming the opposite-direction components.

(6) The torque generated by the power train has been limited to the range where the wheels would cause no locking or skidding. Thus, in bringing the vehicle into the traveling state, the inconveniences that would be caused by the locking or skidding of the wheels can be avoided.

(7) The request for shifting the vehicle from the stopped state into the traveling state has been grasped from the user's release manipulation of the brake pedal. Thus, the transit can be adequately determined as having been requested.

(Modifications)

The embodiment described above may be implemented with the modifications provided below.

In the above embodiment, the hill-start acceleration "as1" has been set based on the road surface gradient "θ" and the friction coefficient "μ". Alternatively, for example, the hill-start acceleration "as1" may be set based on either one of these two parameters.

The scheme for setting the hill-start acceleration "as1" is not limited to the one which is based on the comparison between the value predetermined for every actual vehicle speed "V" and the upper limit guard value "ag". For example, standardization may be made so that the maximum value of the hill-start acceleration "as1" set for every actual vehicle speed "V" may fall on the upper limit value "ag".

The hill-start acceleration "as1" is not limited to the one that will be linearly decreased as the actual vehicle speed "V" becomes higher. However, the hill-start acceleration "as1" may be lowered as the actual vehicle speed "V" becomes higher. The vehicle then can be adequately transited into the traveling state, while the actual vehicle speed "V" is prevented from becoming excessively large.

The advantages equivalent to the above embodiment can be obtained without using the hill-start acceleration "as1", but, for example, by providing a setting in which the requested power train torque "Twpt" becomes smaller as the actual vehicle speed "a" becomes closer to the upper guard value "ag".

The scheme for obtaining the information on the friction coefficient "μ" is not limited to the one exemplified in the above embodiment. For example, a selection switch may be provided in the vehicle compartment (e.g. on the instrument panel) to select the level of locking or skidding of the road surface from a plurality of levels. Thus, in starting the vehicle, the user per se can determine the level of locking or skidding of so the road surface and operate the selection switch. With this scheme as well, the value of the friction coefficient "μ" may be preset according to the operational state of the selection switch, whereby the hill-start acceleration "as1" can be set through the processes described above. In this case, the mode of operation of the selection switch may be adapted to be changed between winter and summer, so that the users in snowy countries, for example, can also enhance the convenience of the vehicles. It should be appreciated that, in this case, the relationship may be preset between each mode of operation of the selection switch and the upper guard value "ag" of the hill-start acceleration "as1" replacing the processes described above. Thus, the processes of calculating the upper guard value "ag" can be omitted.

In the above embodiment, the hill-start control has been ended on condition that the vehicle speed has once become equal to or higher than a predetermined speed and then has been zeroed, and on condition that the user's requested acceleration torque has become equal larger than the requested power train torque "Twpt". Alternatively, for example, another condition may be added to the above conditions, the condition being that a predetermined time period has passed since the commencement of the hill-start control. Alternatively, the hill-start control may be ended on condition that the user's requested brake torque based on the manipulated amount of brakes (detection value of the hydraulic sensor 23) has become equal to or larger than the gradient torque "Trg".

In the above embodiment, the same control has been executed under the hill-start operation, for the case where the brake pedal is manipulated by the user and for the case where the brake pedal is not manipulated. Alternatively, for example, in the case where the manipulated amount of the brake pedal is equal to or larger than a predetermined amount, the hill-start acceleration "as1" may be ensured not to be increased irrespective of the decrease in the vehicle speed.

In the above embodiment, the operation of releasing brakes conducted by the user on an ascending slope has been regarded as the request for starting the hill-start control. Alternative to this, for example, in the case where a switch for instructing automatic start is provided in the vehicle compartment (e.g. on the instrument panel) so that the automatic start can be instructed through the operation of the switch, the operation of the switch equal to or exceeding a predetermined level of releasing the brakes may be regarded as being the request for starting the hill-start control.

In the embodiment described above, the reference model has been set based on the response characteristics at the time when the response delay of the actual acceleration is maximized with respect to the step change of the target acceleration. Alternatively, for example, the reference model may be variably set according to the response characteristics for every operating condition of the vehicle. Also, the reference model is not limited to the primary delay mode, but may, for example, be a secondary delay model.

The feedback controller B24 is not limited to the one that performs PID (proportional-integral-differential) control, but may be the one that performs either one of or any two of P control, I control and D control. Alternatively, modern control may be used instead of classical control.

The feedforward controller B26 is not limited to the one that performs the processes described above. The feedforward controller B26 may calculate the feedforward manipulated variable "Tff" only from the reference force "Maj", for example. Also, the feedforward manipulated variable "Tff" may be calculated using either one of or any two of the air resistance, the road surface resistance and the gravity. However, it is preferred the feedforward manipulated variable "Tff" be calculated based on the gravity, for avoiding and suppressing the displacement of the vehicle in the direction opposite to the travel direction under the hill-start control.

In the embodiment described above, two-degree freedom control has been performed. However, alternative to this, only feedback so control, such as PID control, may be performed.

In the embodiment described above, the model follow-up control has been performed. Alternative to this, the reference model setter B14 may be omitted.

In the acceleration control in the embodiment described above, the means for imparting positive torque to the vehicle (more particularly the drive wheels 16 of the vehicle) has been exemplified by the power train, i.e. motive power generator, including the engine 10 and the automatic transmission system 14. Alternatively, however, a motor may be used, for example, as the motive power generator.

In the acceleration control in the embodiment described above, the means for imparting negative torque to the vehicle (more particularly the drive wheels 16 of the vehicle) has been exemplified by the hydraulic brake actuator. Alternatively, however, an electric braking system may be used as disclosed, for example, in Japanese Patent Laid-Open Publication No. 2004-075055. Alternatively, a generator may be used, for example, which can convert the torque of the wheels (drive wheels 16 and the idler wheels 18) into electric energy.

In the above embodiment, a target acceleration has been set in automatically shifting the vehicle from the stopped state into the traveling state. Alternatively, only a target torque may be set and an acceleration may not be set. In this case as well, continuing the operation of the motive power generator is advantageous for the control for automatically shifting the vehicle into the traveling state, even when the brake pedal is manipulated during the control.

The present invention may be embodied in several other forms without departing from the spirit thereof. The embodiments and modifications described so far are therefore intended to be only illustrative and not restrictive, since the scope of the invention is defined by the appended claims rather than by the description preceding them. All changes that fall within the metes and bounds of the claims, or equivalents of such metes and bounds, are therefore intended to be embraced by the claims.

What is claimed is:

1. An apparatus for controlling automatic travel of a vehicle equipped with a motive power generator that generates torque to travel the vehicle and a brake pedal to be pressed by a vehicle driver to stop the vehicle, comprising:
a sensor that detects information concerning travel of the vehicle on a road; and
a controller configured to control an automatic travel of the vehicle based on the information concerning travel of the vehicle detected by the sensor;

acquire, using the information detected by the sensor, information concerning characteristics of a surface of the road on which the vehicle is present currently, the characteristics including a friction coefficient of the surface of the road;

first determine whether or not a command for shifting the vehicle from a stopped state of the vehicle to a traveling state of the vehicle is issued;

automatically shift the vehicle from the stopped state of the vehicle to the traveling state of the vehicle instead of remaining in the stopped state by controlling a drive of the motive power generator based on the acquired information, when it is determined that the command for shifting the vehicle from the stopped state to the traveling state is issued;

second determine whether or not, of a component of gravity applied to the vehicle, there is a force component acting in a direction opposite to a travel direction of the vehicle; and control the motive power generator to continually operate to travel the vehicle in the travel direction instead of ending travel due to manipulation of the brake pedal in the situations (i) that the brake pedal is pressed by the driver and (ii) that the brake pedal is not pressed by the driver, when it is determined that there is the force component acting in the direction opposite to the travel direction of the vehicle.

2. The apparatus of claim 1, wherein the controller is configured to detect a travel speed of the vehicle;

determine whether or not the travel speed of the vehicle becomes higher than a predetermined speed and then becomes zero; and cancel the automatic travel of the vehicle, when the travel speed of the vehicle is determined to become higher than the predetermined speed and then becomes zero.

3. The apparatus of claim 2, wherein the controller is configured to determine whether or not the torque which is generated by the motive power generator is smaller than torque requested from the driver by pressing the brake pedal, and cancel the automatic travel of the vehicle, when the torque generated by the motive power generator is determined to be larger than the requested torque.

4. The apparatus of claim 3, wherein the information includes a slope of the road surface, and the controller is configured to control the drive of the motive power generator so that the motive power generator generates the torque to overcome the force component applied in the direction opposite to the travel direction of the vehicle.

5. The apparatus of claim 4, wherein the controller is configured to set a target acceleration based on the travel speed of the vehicle; and perform feedforward control of an actual acceleration of the vehicle to the target acceleration by operating the drive of the motive power generator based on the slope of the road surface.

6. The apparatus of claim 5, wherein the controller is configured to limit the torque generated by the motive power generator based on the information concerning the characteristics of the surface of the road on which the vehicle is present currently so as not to cause wheels of the vehicle to lock.

7. The apparatus of claim 6, wherein the contents of the command for shifting the vehicle from the stopped state to the traveling state is determined based on information showing a driver's release action of the brake pedal.

8. The apparatus of claim 1, wherein the controller is configured to determine whether or not the torque which is generated by the motive power generator is smaller than torque requested from the driver by pressing the brake pedal, and end the control of the automatic travel, when the torque generated by the motive power generator becomes larger than the requested torque.

9. The apparatus of claim 1, wherein the information includes a slope of the road surface, and the controller is configured to control the drive of the motive power generator so that the motive power generator generates the torque to overcome the force component applied in the direction opposite to the travel direction of the vehicle.

10. The apparatus of claim 2, wherein the controller is configured to set a target acceleration based on the travel speed of the vehicle; and feedforward control an actual acceleration of the vehicle to the target acceleration by operating the drive of the motive power generator based on the slope of the road surface.

11. The apparatus of claim 1, wherein the controller is configured to limit the torque generated by the motive power generator based on the information concerning the characteristics of the surface of the road on which the vehicle is present currently so as not to cause wheels of the vehicle to lock.

12. The apparatus of claim 1, wherein contents of the command is determined based on information showing a driver's release action of the brake pedal.

13. A vehicle travel control system for controlling travel of a vehicle equipped with an axle, a brake pedal to be pressed by a vehicle driver to stop the vehicle, the system comprising:

a motive power generator that generates torque that drives the axle to travel the vehicle;

a sensor that detects information concerning travel of the vehicle on a road; and a controller configured to control automatic travel of the vehicle based on the information detected by the sensor acquire, using the information detected by the sensor, information concerning characteristics of a surface of the road on which the vehicle is present currently, the characteristics including a friction coefficient of the surface of the road;

first determine whether or not a command for shifting the vehicle from a stopped state of the vehicle to a traveling state of the vehicle is issued;

automatically shift the vehicle from the stopped state of the vehicle to the traveling state of the vehicle instead of remaining in the stopped state by controlling a drive of the motive power generator based on the acquired information concerning the friction coefficient of the road surface from the characteristics of the road surface on which the vehicle is present currently, when it is determined that the command for shifting the vehicle from the stopped state to the traveling state is issued;

second determine whether or not, of a component of gravity applied to the vehicle, there is a force component applied in a direction opposite to a travel direction of the vehicle; and control the motive power generator to continually operate to travel the vehicle in the travel direction instead of ending travel due to manipulation of the brake pedal in the situations (i) that the brake pedal is pressed by the driver and (ii) that the brake pedal is not pressed by the driver, when it is determined that there is the force component applied in the direction opposite to the travel direction of the vehicle.

14. The vehicle travel control system of claim 13, wherein the controller is configured to detect a travel speed of the vehicle;

determine whether or not the travel speed of the vehicle becomes higher than a predetermined speed and then becomes zero; and end control of the automatic travel of the vehicle, when the travel speed of the vehicle is determined to become higher than the predetermined speed and then become zero.

15. The vehicle travel control system of claim 14, wherein the controller is configured to determine whether or not torque which is generated by the motive power generator is smaller than torque requested from the driver by pressing the brake pedal, and to cancel control of the automatic travel, when the torque generated by the motive power generator becomes larger than the requested torque.

* * * * *